(12) United States Patent  (10) Patent No.: US 12,143,707 B2
Jinnouchi  (45) Date of Patent: Nov. 12, 2024

(54) IMAGING APPARATUS AND INFORMATION PROCESSING METHOD

(71) Applicant: SONY GROUP CORPORATION, Tokyo (JP)

(72) Inventor: Ryo Jinnouchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 172 days.

(21) Appl. No.: 17/754,030

(22) PCT Filed: Sep. 10, 2020

(86) PCT No.: PCT/JP2020/034264
§ 371 (c)(1),
(2) Date: Mar. 22, 2022

(87) PCT Pub. No.: WO2021/065405
PCT Pub. Date: Apr. 8, 2021

(65) Prior Publication Data
US 2022/0382512 A1  Dec. 1, 2022

(30) Foreign Application Priority Data
Sep. 30, 2019  (JP) .................. 2019-179411

(51) Int. Cl.
*H04N 23/63* (2023.01)
*G06F 3/04817* (2022.01)
*H04N 1/21* (2006.01)
*H04N 1/32* (2006.01)
*H04N 101/00* (2006.01)

(52) U.S. Cl.
CPC ....... *H04N 23/631* (2023.01); *G06F 3/04817* (2013.01); *H04N 1/2125* (2013.01);
(Continued)

(58) Field of Classification Search
CPC .. H04N 1/2125; H04N 1/215; H04N 1/32128; H04N 1/32106; H04N 23/631;
(Continued)

(56) References Cited

U.S. PATENT DOCUMENTS 6,128,037 A  10/2000  Anderson
9,843,731 B2  12/2017  Shimosato
(Continued)

FOREIGN PATENT DOCUMENTS

AU  4596297 A  5/1998
JP  2000115685 A  4/2000
(Continued)

OTHER PUBLICATIONS

International Search Report and Written Opinion of PCT Application No. PCT/JP2020/034264, issued on Nov. 25, 2020, 10 pages of ISRWO.

*Primary Examiner* — Daniel M Pasiewicz
(74) *Attorney, Agent, or Firm* — CHIP LAW GROUP

(57) ABSTRACT

There is provided an imaging apparatus including a user interface control section. The user interface control section performs a process of displaying a plurality of images in a stacked form as a first display mode of an image group including the plurality of images, a process of individually displaying each of the plurality of images as a second display mode of the image group, and a process of detecting an operation of recording a voice note corresponding to a selected image selected in the second display mode.

13 Claims, 24 Drawing Sheets

(52) U.S. Cl.
CPC ......... *H04N 1/215* (2013.01); *H04N 1/32106* (2013.01); *H04N 1/32128* (2013.01); *H04N 23/633* (2023.01); *H04N 2101/00* (2013.01); *H04N 2201/3247* (2013.01); *H04N 2201/3264* (2013.01)

(58) Field of Classification Search
CPC ............. H04N 23/633; H04N 2101/00; H04N 2201/3247; H04N 2201/3264; G06F 3/04819
See application file for complete search history.

(56) References Cited

U.S. PATENT DOCUMENTS

| | | | |
|---|---|---|---|
| 11,218,639 B1* | 1/2022 | Walker | H04N 23/633 |
| 2006/0098105 A1* | 5/2006 | Okisu | H04N 5/772 |
| | | | 707/E17.026 |
| 2011/0314401 A1 | 12/2011 | Salisbury et al. | |
| 2013/0031502 A1 | 1/2013 | Salisbury et al. | |
| 2014/0184848 A1 | 7/2014 | Shimosato | |

FOREIGN PATENT DOCUMENTS

| | | |
|---|---|---|
| JP | 2002223401 A | 8/2002 |
| JP | 2002223403 A | 8/2002 |
| JP | 2005064637 A | 3/2005 |
| JP | 2005-293339 A | 10/2005 |
| JP | 2010183523 A | 8/2010 |
| JP | 2011138141 A | 7/2011 |
| JP | 2013090267 A | 5/2013 |
| JP | 6084029 B2 | 2/2017 |
| JP | 2017-138777 A | 8/2017 |
| TW | 359795 B | 6/1999 |
| WO | 1998/17059 A1 | 4/1998 |

\* cited by examiner

IMAGING APPARATUS AND INFORMATION PROCESSING METHOD

CROSS REFERENCE TO RELATED APPLICATIONS

This application is a U.S. National Phase of International Patent Application No. PCT/JP2020/034264 filed on Sep. 10, 2020, which claims priority benefit of Japanese Patent Application No. JP 2019-179411 filed in the Japan Patent Office on Sep. 30, 2019. Each of the above-referenced applications is hereby incorporated herein by reference in its entirety.

TECHNICAL FIELD

The present technology relates to an imaging apparatus, an information processing method, and a program, and particularly relates to a technology for a voice note that is associated with a captured image.

BACKGROUND ART

A user who uses an imaging apparatus (also referred to as "camera") for work such as a professional photographer, a reporter, or the like uploads an image captured by the imaging apparatus to a server (FTP (File Transfer Protocol) server) of a newspaper company or the like on site using a communication function of the imaging apparatus (for example, PTL 1).

Meanwhile, a newspaper company or the like may receive an enormous amount of image data since image data is uploaded from a plurality of users. It is necessary for the newspaper company or the like to efficiently search for target image data and find out what is captured in the transmitted image data in what situation.

To meet such a demand, the user adds, in some cases, a voice note to image data in an imaging apparatus (for example, PTL 2).

The newspaper company or the like finds out what the transmitted image data is by checking the voice note associated with the image data. This makes it possible to efficiently proceed with subsequent editing and selection tasks.

CITATION LIST

Patent Literature

[PTL 1]
Japanese Patent Laid-Open No. 2017-138777
[PTL 2]
Japanese Patent Laid-Open No. 2005-293339

SUMMARY

Technical Problem

Incidentally, an imaging apparatus has a single shooting mode and a continuous shooting mode. The single shooting mode is to capture one still image by a release operation. The continuous shooting mode is to capture a plurality of still images by the release operation. Further, in a case where a series of images captured in the continuous shooting mode is grouped as an image group, a target to be associated with a voice note is not clear in some cases.

In view of the foregoing, it is desirable to provide an environment in which a voice note can be appropriately associated with a series of images captured in a continuous shooting mode.

Solution to Problem

An imaging apparatus according to an embodiment of the present technology includes a user interface control section configured to perform: a process of displaying a plurality of images in a stacked form as a first display mode of an image group including the plurality of images; a process of individually displaying each of the plurality of images as a second display mode of the image group; and a process of detecting an operation of recording a voice note corresponding to a selected image selected in the second display mode.

This configuration enables the image group into which the plurality of images has been grouped to be visually recognized, while enabling the plurality of images included in the image group to be individually viewed.

In the imaging apparatus described above, a file management section configured to generate a file of the voice note as a separate file from an image file may be included.

That is, audio data is not stored as metadata of the image file.

In the imaging apparatus described above, the plurality of images may be a series of images captured using a continuous shooting function.

By displaying a series of continuous-shot images in the first display mode, it is possible to clearly recognize that the series of continuous-shot images is the series of images.

In the imaging apparatus described above, one of the plurality of images belonging to the image group may be displayed as a representative image in the process of displaying the image group in the first display mode.

Accordingly, it is possible to display, as the representative image, a characteristic image from which the contents of the image group can be identified.

In the imaging apparatus described above, a representative image of the series of images captured using the continuous shooting function may be an image captured first among the series of images.

Since the series of continuous-shot images is the series of images continuously captured in a relatively short period of time, there is no great difference between the images in composition, how the subject has been captured, and the like in many cases. According to the present configuration, the first captured image is automatically selected as the representative image of the series of continuous-shot images.

The user interface control section according to the imaging apparatus described above may perform control to display, in the first display mode, an icon image indicating that a voice note has been recorded in the image group.

Accordingly, it is possible to recognize, from the icon image, that the voice note has been recorded in the image group.

The user interface control section according to the imaging apparatus described above may display, in a case where a voice note has been recorded for the representative image among the images belonging to the image group, an icon image indicating that the voice note has been recorded in the image group.

That is, even in a case where the voice note has been recorded for an image other than the representative image, the icon image is not displayed.

The user interface control section according to the imaging apparatus described above may display, in a case where there is at least one image for which a voice note has been recorded among the images belonging to the image group, the icon image.

Accordingly, it is possible to discriminate whether or not any image for which the voice note has been recorded is included without checking each image belonging to the image group.

The user interface control section according to the imaging apparatus described above may select, as the representative image, an image for which a voice note has been recorded among the images belonging to the image group.

Accordingly, the icon image is not displayed for an image group that does not include any image for which a voice note has been recorded, while the icon image is displayed for an image group that includes at least one image for which a voice note has been recorded.

The user interface control section according to the imaging apparatus described above may not generate, in the first display mode, the file of the voice note on the basis of the operation.

For example, in a case where a plurality of images is displayed in a stacked form, the operation of recording a voice note is not detected. Alternatively, even in a case where the operation of recording a voice note has been detected, the process of recording a voice note is not performed.

The user interface control section according to the imaging apparatus described above may detect the operation in the first display mode.

For example, in a case where the operation of recording a voice note has been detected in the first display mode, the user interface control section performs the process of associating the voice note with the entire image group. Alternatively, in a case where the operation of recording a voice note has been detected in the first display mode, the user interface control section performs the process of associating the voice note with the representative image being displayed. Moreover, the user interface control section may perform the display process to enable selection of a target to be associated with the voice note.

The file management section according to the imaging apparatus described above may assign a file name of the voice note such that a character string of a portion excluding an extension is identical to a character string of a file name of a target image to be associated.

Accordingly, it is possible to identify the image file associated with the voice note from the file name.

The user interface control section according to the imaging apparatus described above may perform, in a case where the user interface control section has detected a deletion operation for an image for which the voice note has been recorded, a process of presenting to a user a first option for deleting both the image and the voice note, a second option for deleting only the voice note, and a third option for canceling the deletion operation.

Displaying the option for cancellation and the options for performing the deletion at the same time can reduce the number of operations until the deletion and reduce the operation burden on the user.

An information processing method according to another embodiment of the present technology is performed by an imaging processing apparatus and includes: a process of displaying a plurality of images in a stacked form as a first display mode of an image group including the plurality of images; a process of individually displaying each of the plurality of images as a second display mode of the image group; a process of detecting an operation of selecting one image in the second display mode; and a process of detecting an operation of recording a voice note corresponding to the image that has been selected.

A program according to a further embodiment of the present technology causes an information processing apparatus to perform: a process of displaying a plurality of images in a stacked form as a first display mode of an image group including the plurality of images; a process of individually displaying each of the plurality of images as a second display mode of the image group; a process of detecting an operation of selecting one image in the second display mode; and a process of detecting an operation of recording a voice note corresponding to the image that has been selected.

This enables, in an imaging apparatus, the image group into which the plurality of images has been grouped to be visually recognized, while enabling the plurality of images included in the image group to be individually viewed.

DESCRIPTION OF EMBODIMENT

An embodiment will be described below in the following order.
<1. Uploading of Image by Imaging Apparatus>
<2. Configuration of Imaging Apparatus>
<3. Functional Configuration of Imaging Apparatus>
<4. User Interface Screen>
<5. Process Flow>
<5-1. Process of Detecting Image Reproduction Operation>
<5-2. Process of Detecting Assignable Button Operation>
<6. Modifications>
<7. Summary>
<8. Present Technology>

1. Uploading of Image by Imaging Apparatus

An imaging apparatus 1 according to the embodiment can upload a captured image to an external server. This image uploading will be described first.

Figure 1:
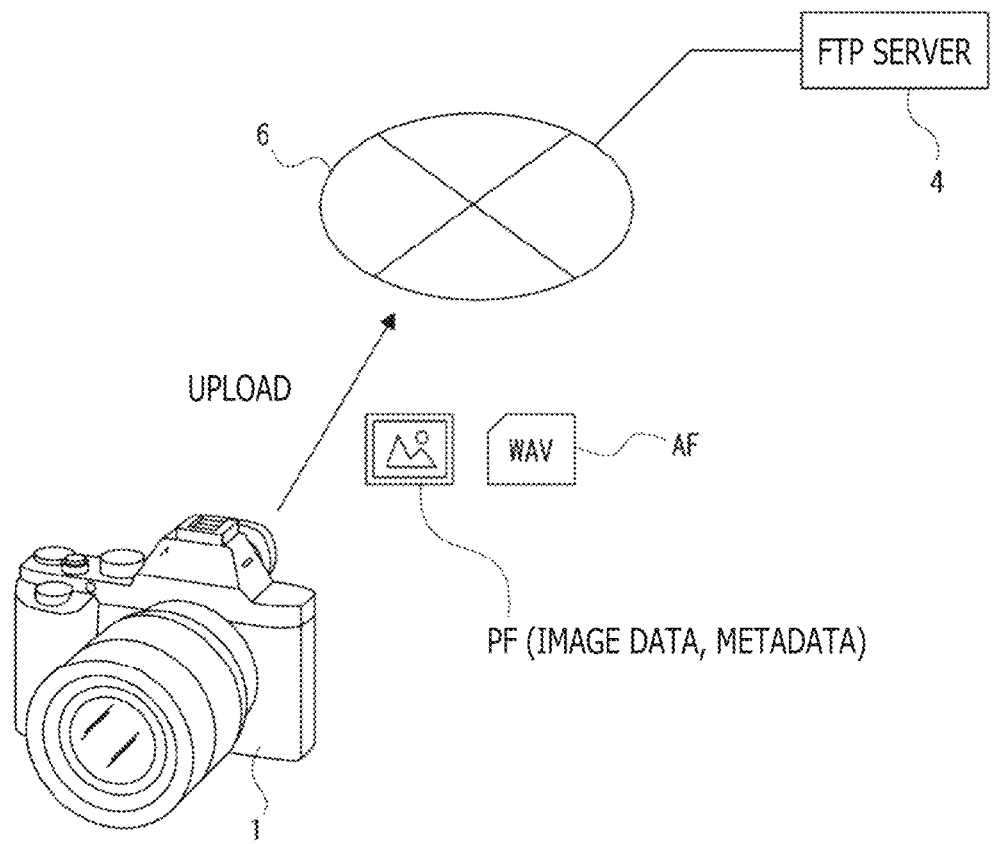
FIG. 1 is an explanatory diagram of transfer and upload of an image file and an audio file according to an embodiment of the present technology.

FIG. 1 illustrates the imaging apparatus 1, an FTP server 4, and a network 6.

Examples of the imaging apparatus 1 include various types of imaging apparatuses such as a video camera and a still camera. The illustrated imaging apparatus 1 is assumed to be a camera used by a photographer or a reporter at a sports or event venue or a reporting site. For example, while a photographer may use one imaging apparatus 1 in some cases, the photographer may use a plurality of imaging apparatuses 1 in other cases.

It is to be noted that the imaging apparatus 1 may occasionally be referred to as "camera" in the description.

For example, the network 6 is assumed to be the Internet, a home network, a LAN (Local Area Network), a satellite communication network, or other various networks.

For example, a server run by a newspaper company, a broadcasting station, a communication company, or the like can be considered as the FTP server 4. Needless to say, the FTP server 4 is not limited to such a server.

A cloud server, a home server, a personal computer, or the like is assumed as the form of the FTP server 4.

The imaging apparatus 1 can upload captured image data or the like to the FTP server 4 through the network 6.

For example, in a case where the user using the imaging apparatus 1 is a professional photographer who does a job for a newspaper company, the assumed usage of the system is such that the user immediately uploads an image captured at an event venue from the imaging apparatus 1 to the FTP server 4. Alternatively, the FTP server 4 may be a mobile terminal apparatus such as a smartphone owned by the user, and image data or the like may be uploaded to the mobile terminal apparatus serving as the FTP server 4 through the network 6 such as near field communication.

It is to be noted that for this purpose, FTP setting information for uploading to the FTP server 4 is registered in the imaging apparatus 1. The contents of the FTP setting information include a host name, a storage destination path, a user name, a password, a connection type, and the like of the FTP server 4.

The user can input the contents of such FTP setting information by performing an input operation on the imaging apparatus 1, causing the imaging apparatus 1 to register the FTP setting information therein. Alternatively, external equipment may be caused to transfer the contents of the FTP setting information, thereby causing the imaging apparatus 1 to register the FTP setting information therein.

In the present embodiment, an assumed situation is such that an image file PF and an audio file AF are uploaded and transmitted from the imaging apparatus 1 to the FTP server 4.

The imaging apparatus 1 generates image data as a still image or a moving image by an imaging operation and generates metadata as additional information.

The image file PF illustrated in FIG. 1 is assumed to be a data file including image data and metadata associated with the image data.

Further, in the present embodiment, the imaging apparatus 1 has a voice note function. The voice note function is a function that can add annotation, explanation, and the like to a captured image by voice. For example, the user utters while performing a predetermined operation with a specific image specified, or when the photographer has captured one still image, the photographer utters to explain the contents of the image while performing a predetermined operation. In this manner, the voice is recorded and a voice note associated with the image data is generated.

The audio file AF illustrated in FIG. 1 is a data file including audio data as a voice note. That is, the audio file AF is a file generated as a separate file from the image file PF.

It is to be noted that while surrounding sounds are also recorded as audio track data when a moving image is being captured, the audio track data is audio data included in the image file PF and is different from the audio file AF. The audio file AF described herein indicates a file including audio data as a voice note.

In the following description, a still image is assumed to be captured. In the examples described below, therefore, the image file PF includes still image data and metadata, while the audio file AF includes voice note data generated along with capturing of the still image.

It is to be noted that the audio file AF is not necessarily associated with every image file PF. Only in a case where the photographer or the like inputs voice using the voice note function, the audio file AF is generated and associated with the corresponding image file PF in the imaging apparatus 1.

At the time of uploading from the imaging apparatus 1 to the FTP server 4, therefore, there are cases where the image file PF and the audio file AF are transmitted in pairs, and cases where only the image file PF is transmitted.

2. Configuration of Imaging Apparatus

Figure 2:
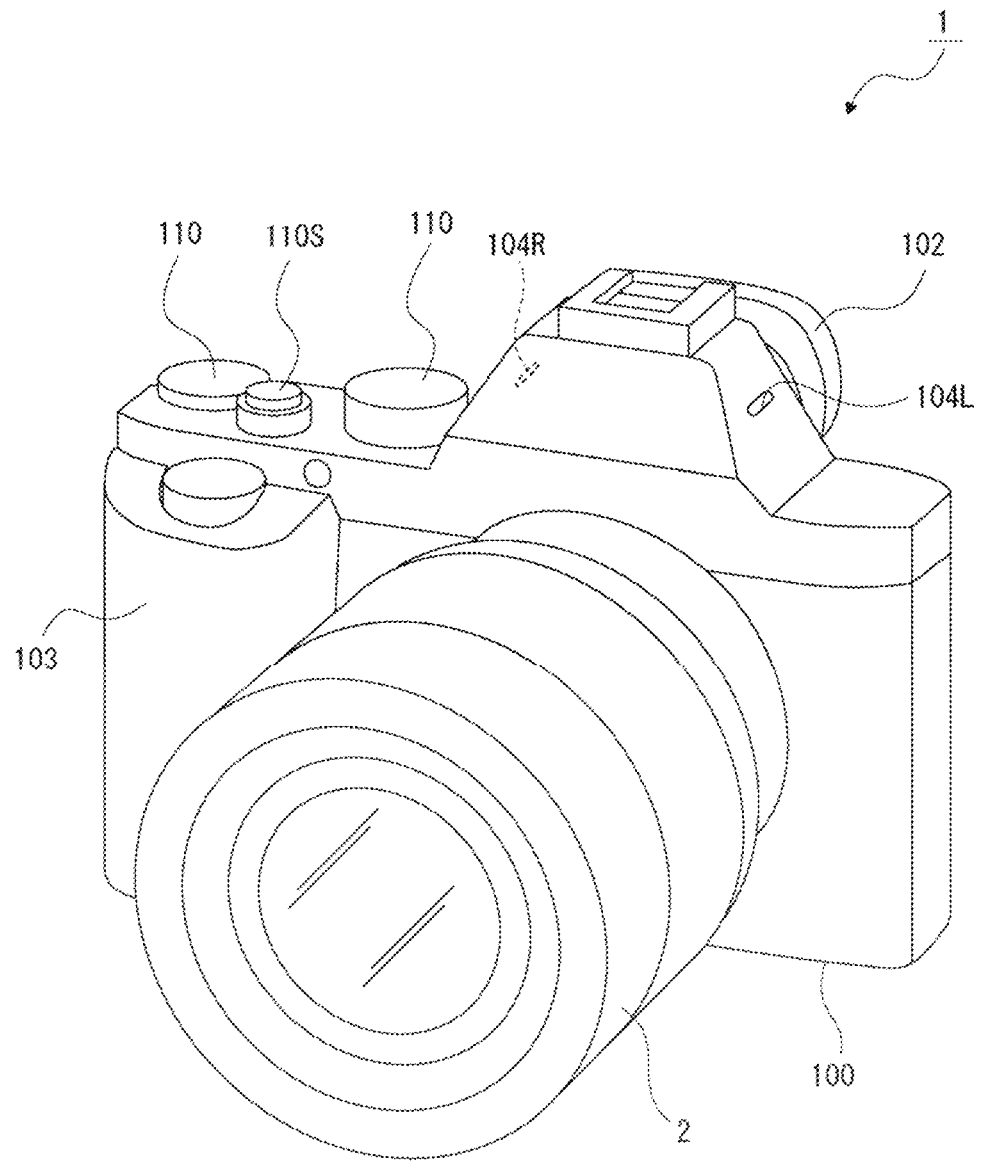
FIG. 2 is a perspective view of an imaging apparatus according to the embodiment.
Figure 3:
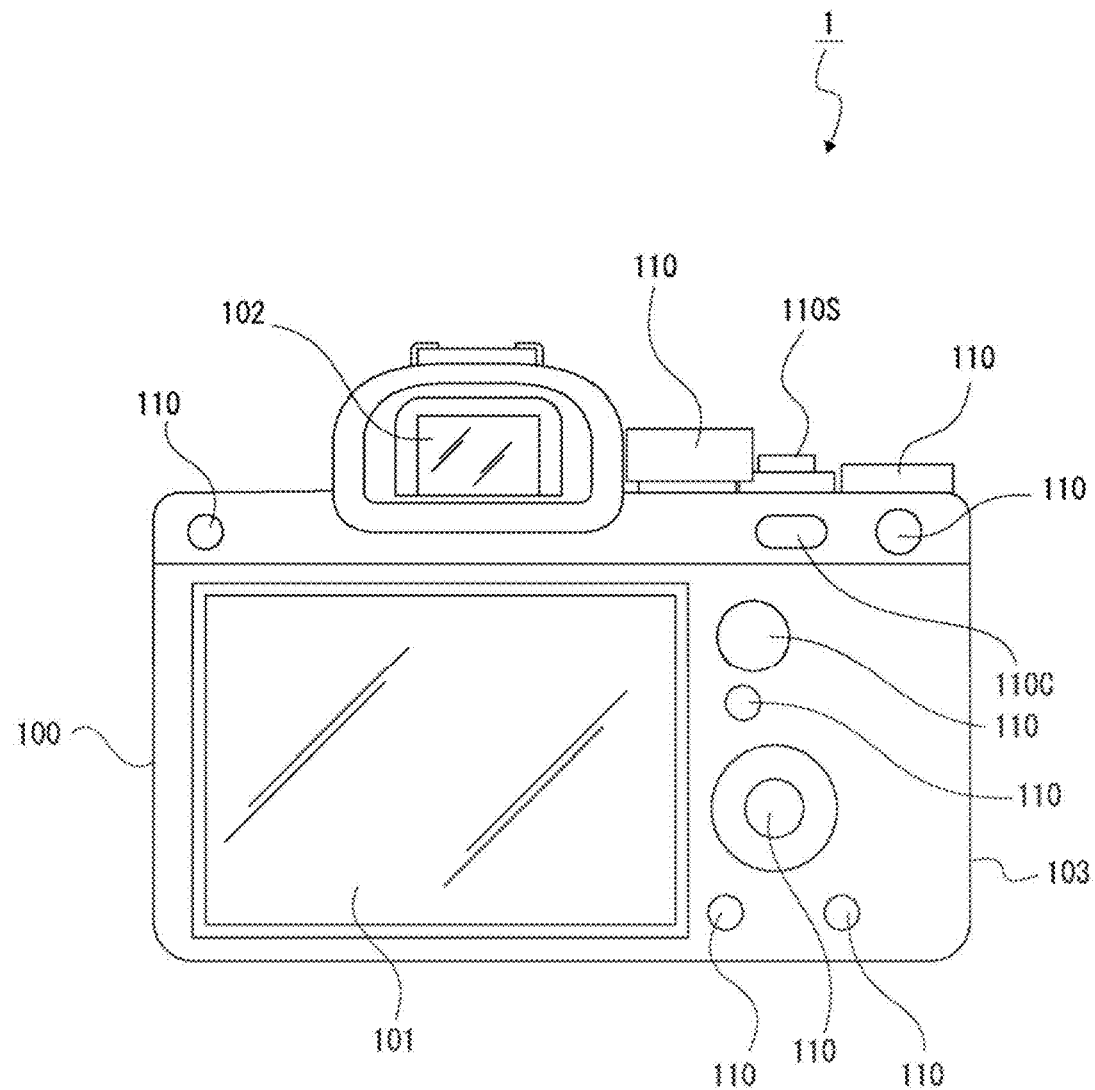
FIG. 3 is a rear view of the imaging apparatus according to the embodiment.

FIG. 2 is a perspective view of the imaging apparatus 1 according to the embodiment when viewed from the front. FIG. 3 is a rear view of the imaging apparatus 1 according to the embodiment. Here, the imaging apparatus 1 is a so-called digital still camera and can capture both a still image and a moving image by switching the imaging mode. Further, "single shooting mode" and "continuous shooting mode" are provided to capture a still image. "Single shooting mode" is to capture one still image each time a release operation is performed. "Continuous shooting mode" is to continuously capture a plurality of still images by the release operation.

It is to be noted that the imaging apparatus 1 according to the present embodiment is not limited to the digital still camera and may be a video camera that is mainly used to capture a moving image and is also capable of capturing a still image.

In the imaging apparatus 1, a lens barrel 2 is provided or detachably provided on a front side of a main body housing 100 included in the main body of the camera.

A display panel 101 is provided on a back side (photographer side) of the imaging apparatus 1 and implemented by a display device such as a liquid crystal display (LCD: Liquid Crystal Display), an organic EL (Electro-Luminescence) display, or the like, for example.

Further, a display section is also provided as a viewfinder 102 and is formed using an LCD, an organic EL display, or the like. Further, the viewfinder 102 is not limited to an electronic viewfinder (EVF: Electronic View Finder) and may be an optical viewfinder (OVF: Optical View Finder).

The user can visually recognize an image and various types of information using the display panel 101 and the viewfinder 102.

In this example, while the imaging apparatus 1 includes both the display panel 101 and the viewfinder 102, the imaging apparatus 1 is not limited thereto. The imaging apparatus 1 may include only one of the display panel 101 and the viewfinder 102 or may detachably include both or one of the display panel 101 and the viewfinder 102.

Various operation elements 110 are provided on the main body housing 100 of the imaging apparatus 1.

For example, various types of operation elements 110 such as a key, a dial, and a combined operation element for pressing/rotation are provided to implement various operation functions. For example, a menu operation, a reproduction operation, a mode selection operation, a focus operation, a zoom operation, an operation of selecting parameters such as shutter speed and an F value (F-number), and the like can be performed. While a detailed description of each operation element 110 is omitted, a shutter button 110S and an assignable button 110C are particularly illustrated among the operation elements 110 in the present embodiment.

The shutter button 110S is used for a shutter operation (release operation) and an AF operation by half-pressing.

The assignable button 110C is an operation element that is also called a custom button and is a button to which the user can assign desired operation functions. In the present embodiment, the assignable button 110C is assigned operation functions such as voice note recording and reproduction. That is, operating the assignable button 110C under a specific situation can record or reproduce a voice note, for example. Long pressing the assignable button 110C under a specific situation can record a voice note while the assignable button 110C is being pressed, for example. Releasing the assignable button 110C being long pressed stops recording the voice note. Further, short pressing the assignable button 110C reproduces the recorded voice note.

The shutter button 110S is provided on an upper right surface of the main body housing 100. For example, while the user holds a grip portion 103 with the right hand, the user can perform a pressing operation on the shutter button 110S with the index finger of the right hand.

Further, the assignable button 110C is provided on an upper portion of the back side of the main body housing 100 as illustrated in FIG. 2, for example. The user can perform a pressing operation on the assignable button 110C with the thumb of the right hand.

It is to be noted that instead of the assignable button 110C, a dedicated operation button for executing voice note-related functions may be provided.

Further, in a case where the display section such as the display panel 101 has a touch panel function, the display panel 101 may serve as one of the operation elements 110.

A microphone hole 104 is formed on each of both sides of the viewfinder 102. The microphone hole 104 on the left side viewed from the photographer is a microphone hole 104L, while the microphone hole 104 on the right side is a microphone hole 104R.

Since the microphone hole 104L and the microphone hole 104R are formed, the ambient sound and the utterance of the photographer can be obtained as stereo sound. Each microphone, not illustrated, is provided inside a corresponding one of the microphone holes 104.

Figure 4:
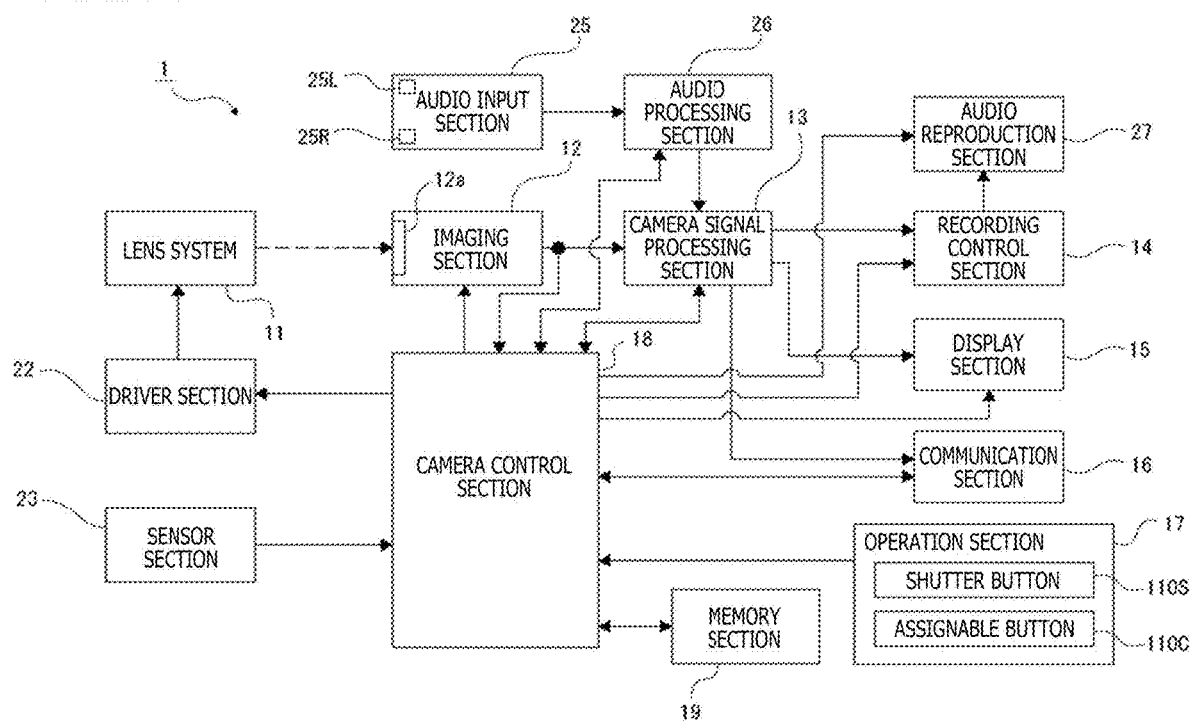
FIG. 4 is a block diagram of the imaging apparatus that performs communication in the embodiment.

FIG. 4 illustrates an internal configuration of the imaging apparatus 1 including the lens barrel 2.

For example, the imaging apparatus 1 includes a lens system 11, an imaging section 12, a camera signal processing section 13, a recording control section 14, a display section 15, a communication section 16, an operation section 17, a camera control section 18, a memory section 19, a driver section 22, a sensor section 23, an audio input section 25, an audio processing section 26, and an audio reproduction section 27.

The lens system 11 includes lenses such as a zoom lens and a focus lens, an aperture mechanism, and the like. The lens system 11 guides light (incident light) from the subject and collects the light on the imaging section 12.

For example, the imaging section 12 includes an image sensor 12a (imaging element) of a CMOS (Complementary Metal Oxide Semiconductor) type, a CCD (Charge Coupled Device) type, or the like.

For example, the imaging section 12 performs a CDS (Correlated Double Sampling) process, an AGC (Automatic Gain Control) process, and the like on an electrical signal obtained by photoelectrically converting the light received by the image sensor 12a, and further performs an A/D (Analog/Digital) conversion process. Then, the imaging section 12 outputs an imaging signal as digital data to the subsequent camera signal processing section 13 and the camera control section 18.

For example, the camera signal processing section 13 is configured as an image processing processor using a DSP (Digital Signal Processor) or the like. The camera signal processing section 13 performs various signal processes on a digital signal (captured image signal) from the imaging section 12. For example, the camera signal processing section 13 performs a preprocess, a synchronization process, a YC generation process, a resolution conversion process, a file formation process, and the like as camera processes.

In the preprocess, a clamp process of clamping the black level of R, G, and B to a predetermined level and a correction process among R, G, and B color channels are performed on the captured image signal received from the imaging section 12, for example.

In the synchronization process, a color separation process is performed such that the image data for each pixel incudes all the R, G, and B color components. For example, in the case of an imaging element using a Bayer color filter, a demosaicing process is performed as the color separation process.

In the YC generation process, a luminance (Y) signal and a color (C) signal are generated (separated) from R, G, and B image data.

In the resolution conversion process, the resolution conversion process is performed on the image data on which various signal processes have been performed.

In the file formation process, for example, a recording or communication file is generated by performing, for example, compression encoding, formatting, generation or addition of metadata, and the like for recording or communication on the image data on which various processes described above have been performed.

For example, the image file PF in a format such as JPEG (Joint Photographic Experts Group), TIFF (Tagged Image File Format), GIF (Graphics Interchange Format), or the like is generated as a still image file. Further, it is also conceivable to generate the image file PF as an MP4 format or the like, which is used to record an MPEG-4 compliant moving image and voice.

It is to be noted that the image file PF is also conceivably generated as raw (RAW) image data.

The camera signal processing section 13 generates metadata so as to include information regarding process parameters in the camera signal processing section 13, various control parameters obtained from the camera control section 18, information indicating the operation states of the lens system 11 and the imaging section 12, mode setting information, and imaging environment information (the date and time, location, and the like).

For example, the recording control section 14 performs recording and reproduction on a recording medium using a nonvolatile memory. For example, the recording control section 14 performs a process of recording an image file such as moving image data or still image data, a thumbnail image, or the like on the recording medium.

The actual configuration of the recording control section 14 can be considered in various ways. For example, the recording control section 14 may include a flash memory and a writing/reading circuit thereof incorporated in the imaging apparatus 1. Alternatively, the recording control section 14 may have a configuration of a card recording/reproducing section, which accesses a recording medium for recording/reproduction. The recording medium is detachable to the imaging apparatus 1 and is, for example, a memory card (a portable flash memory or the like). Alternatively, the recording control section 14 may be incorporated in the imaging apparatus 1 as another configuration and implemented as an HDD (Hard Disk Drive) or the like.

The display section 15 is a display section that performs various displays for the photographer. For example, the display section 15 serves as the display panel 101 and the viewfinder 102 using the display devices such as the liquid crystal panel (LCD: Liquid Crystal Display) or the organic EL (Electro-Luminescence) display provided on the housing of the imaging apparatus 1.

The display section 15 causes a display screen to perform various displays on the basis of instructions from the camera control section 18.

For example, the display section 15 causes a reproduction image of image data, which has been read by the recording control section 14 from the recording medium, to be displayed.

Further, in some cases, the display section 15 may be supplied with image data of a captured image whose resolution has been converted for display by the camera signal processing section 13, and the display section 15 may perform display on the basis of the image data of the captured image according to an instruction from the camera control section 18. In this manner, a so-called through image (a monitoring image of the subject) is displayed. The through image is an image captured during confirmation of composition, recording of a moving image, or the like.

Further, the display section 15 causes various operation menus, icons, messages, and the like, that is, GUIs (Graphical User Interfaces) to be displayed on the screen on the basis of an instruction from the camera control section 18.

The communication section 16 performs wired or wireless data communication and network communication with external equipment.

For example, the communication section 16 transmits and outputs captured image data (a still image file or a moving image file) to an external display apparatus, recording apparatus, reproduction apparatus, or the like.

Further, the communication section 16, which serves as a network communication section, can perform communication through the network 6 in various forms such as the Internet, a home network, and a LAN (Local Area Network), and transmit and receive various data to and from a server, a terminal, or the like in the network, for example. In the present embodiment, for example, the communication section 16 performs a communication process of uploading captured image data (the above-described image file or the like) to the FTP server 4.

Further, in the present embodiment, the communication section 16 communicates with an information processing apparatus 2 to transfer the image file PF and the audio file AF.

The operation section 17 collectively represents input devices with which the user performs various operation inputs. Specifically, the operation section 17 represents various operation elements (the key, the dial, a touch panel, a touch pad, and the like) provided on the housing of the imaging apparatus 1.

The operation section 17 detects a user operation and transmits a signal corresponding to the input operation to the camera control section 18.

The shutter button 110S and the assignable button 110C described above are provided as the operation section 17.

The camera control section 18 includes a microcomputer (an arithmetic processing unit) including a CPU (Central Processing Unit).

The memory section 19 stores information and the like that are used by the camera control section 18 for processing. The memory section 19 illustrated in the figure collectively represents a ROM (Read Only Memory), a RAM (Random Access Memory), a flash memory, and the like, for example.

The memory section 19 may be a memory area incorporated in the microcomputer chip as the camera control section 18 or may include a separate memory chip.

The camera control section 18 controls the entire imaging apparatus 1 by executing a program stored in the ROM, the flash memory, or the like of the memory section 19.

For example, the camera control section 18 controls the operation of each necessary section such as the shutter speed control of the imaging section 12, instructions for various signal processes in the camera signal processing section 13, an imaging operation and a recording operation according to user operations, an operation of reproducing a recorded image file, operations of the lens system 11 such as zoom, focus, and aperture adjustment in the lens barrel, and the user interface operations.

The RAM in the memory section 19 is used to temporarily store data, programs, and the like as a work area used by the CPU of the camera control section 18 to perform various data processes.

The ROM and the flash memory (nonvolatile memory) in the memory section 19 are used to store an OS (Operating System) used to control each section by the CPU, content files such as image files, application programs for various operations, firmware, various types of setting information, and the like.

Various types of setting information include the above-described FTP setting information, exposure settings, shutter speed settings, and mode settings as setting information related to the imaging operation, white balance settings, color settings, and settings related to image effects as setting information related to image processes, and custom key settings, display settings, and the like as setting information for operability.

For example, the driver section 22 includes a motor driver for a zoom lens driving motor, a motor driver for a focus lens driving motor, a motor driver for a motor of the aperture mechanism, and the like.

These motor drivers apply drive current to respective drivers according to instructions from the camera control section 18 to cause the focus lens or the zoom lens to move and aperture blades of the aperture mechanism to open or close, for example.

The sensor section 23 collectively represents various sensors mounted in the imaging apparatus.

For example, an IMU (inertial measurement unit) is mounted as the sensor section 23 and can detect the angular velocity using a three-axis angular velocity (gyro) sensor for pitch, yaw, and roll and detect the acceleration using an acceleration sensor, for example.

Further, a positional information sensor, an illumination intensity sensor, and the like may be, in some cases, mounted as the sensor section 23, for example.

For example, the audio input section 25 includes the microphones, a microphone amplifier, and the like, and outputs an audio signal obtained by collecting surrounding sounds. In the present embodiment, a microphone 25L corresponding to the microphone hole 104L and a microphone 25R corresponding to the microphone hole 104R are provided as the microphones.

The audio processing section 26 performs a process of converting the audio signal obtained by the audio input section 25 into a digital audio signal, an AGC process, an audio quality process, a noise reduction process, and the like. The audio data that has undergone these processes is output to the camera signal processing section 13 and the camera control section 18.

For example, when a moving image is captured, the audio data is processed as the audio data associated with the moving image in the camera control section 18.

Further, audio data as a voice note, which has been input by the photographer at the time of reproducing or capturing an image, is made into a file as the audio file AF in the camera signal processing section 13 or the camera control section 18.

The audio file AF can be recorded on the recording medium in association with the image file PF in the recording control section 14 and can be transmitted and output together with the image file PF from the communication section 16.

The audio reproduction section 27 includes an audio signal processing circuit, a power amplifier, a speaker, and the like, and reproduces the audio file AF recorded on the recording medium by the recording control section 14. For example, when the audio file AF is reproduced, the recording control section 14 reads the audio data of the audio file AF and transfers the audio data to the audio reproduction section 27 on the basis of the control of the camera control section 18. The audio reproduction section 27 performs necessary signal processes on the audio data, converts the audio data into an analog signal, and outputs audio from the speaker through the power amplifier. In this manner, the user can listen to the audio recorded as the voice note.

It is to be noted that when the moving image is reproduced, the audio associated with the moving image is reproduced by the audio reproduction section 27.

3. Functional Configuration of Imaging Apparatus

Figure 5:
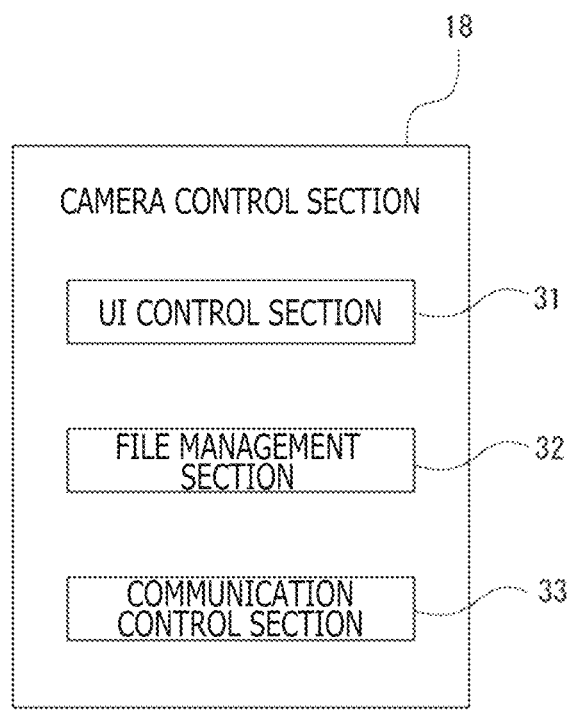
FIG. 5 is an explanatory diagram of a functional configuration of a camera control section according to the embodiment.

Executing the program stored in the ROM or the RAM as the memory section 19 implements a functional configuration as illustrated in FIG. 5 in the imaging apparatus 1.

The imaging apparatus 1 includes a UI (user interface) control section 31, a file management section 32, and a communication control section 33.

The UI control section 31 performs a process of detecting operations on various operation elements 110 included in the imaging apparatus 1, a display process using the display section 15, a process of outputting audio, a process of providing an input operation environment to the user, and the like.

Specifically, the UI control section 31 performs a process of outputting display or audio to provide the user with an environment in which an input operation can be performed. Further, the UI control section 31 outputs display or audio to present various types of information to the user.

Moreover, in a case where any of the operation elements 110 has been operated by the user, the UI control section 31 detects the operation and performs the process corresponding the operation.

In particular, in the present embodiment, the UI control section 31 detects that the assignable button 110C has been pressed under a specific condition, and performs processes of recording a voice note and associating the voice note with an image as corresponding processes.

Further, the UI control section 31 performs processes of providing a UI environment for reproducing a voice note, a UI environment for deleting the voice note, and the like.

The file management section 32 performs a process of storing an image captured by the user as the image file PF, a process of storing a voice note input by the user as the audio file AF, and the like. When the file management section 32 stores the image file PF and the audio file AF, the file management section 32 performs a process of assigning a file name to each file. For example, the file name of the image file PF is obtained by adding an image extension to a counter value. The counter value indicates the number of images (still images or moving images) captured after resetting. Further, the file name of the audio file AF as a voice note is obtained by adding an extension for the audio file AF to the counter value that is identical to the counter value of the image file corresponding to the voice note. In this manner, the audio file AF and the image file PF are associated with each other.

Further, the file management section 32 performs a process of deleting the image file PF and the audio file AF specified by the user.

Moreover, the file management section 32 performs a process of obtaining, from the memory section 19, the image file PF and the audio file AF specified for reproduction.

Further, in the present embodiment, the file management section 32 generates a management file for grouping a series of images captured in the continuous shooting mode as one image group. The management file stores information for identifying image files PF belonging to one image group.

The communication control section 33 is a function for controlling the communication operation of the communication section 16.

The communication control section 33 performs a process of causing the communication section 16 to communicate with the FTP server 4.

Specifically, the communication control section 33 performs a process of uploading to the FTP server 4 through the communication section 16.

The communication control section 33 performs a process of uploading the image file PF and the audio file AF generated by the file management section 32 to the FTP server 4 as a pair.

4. User Interface Screen

A UI screen on the display panel 101 of the imaging apparatus 1 will be described. In particular, display examples related to continuous-shot images and a voice note will be mainly described. It is to be noted that each screen described below is an example of a screen displayed on the display panel 101 as the display section 15 when the camera control section 18 of the imaging apparatus 1 executes the function as the UI control section 31.

Figure 6:
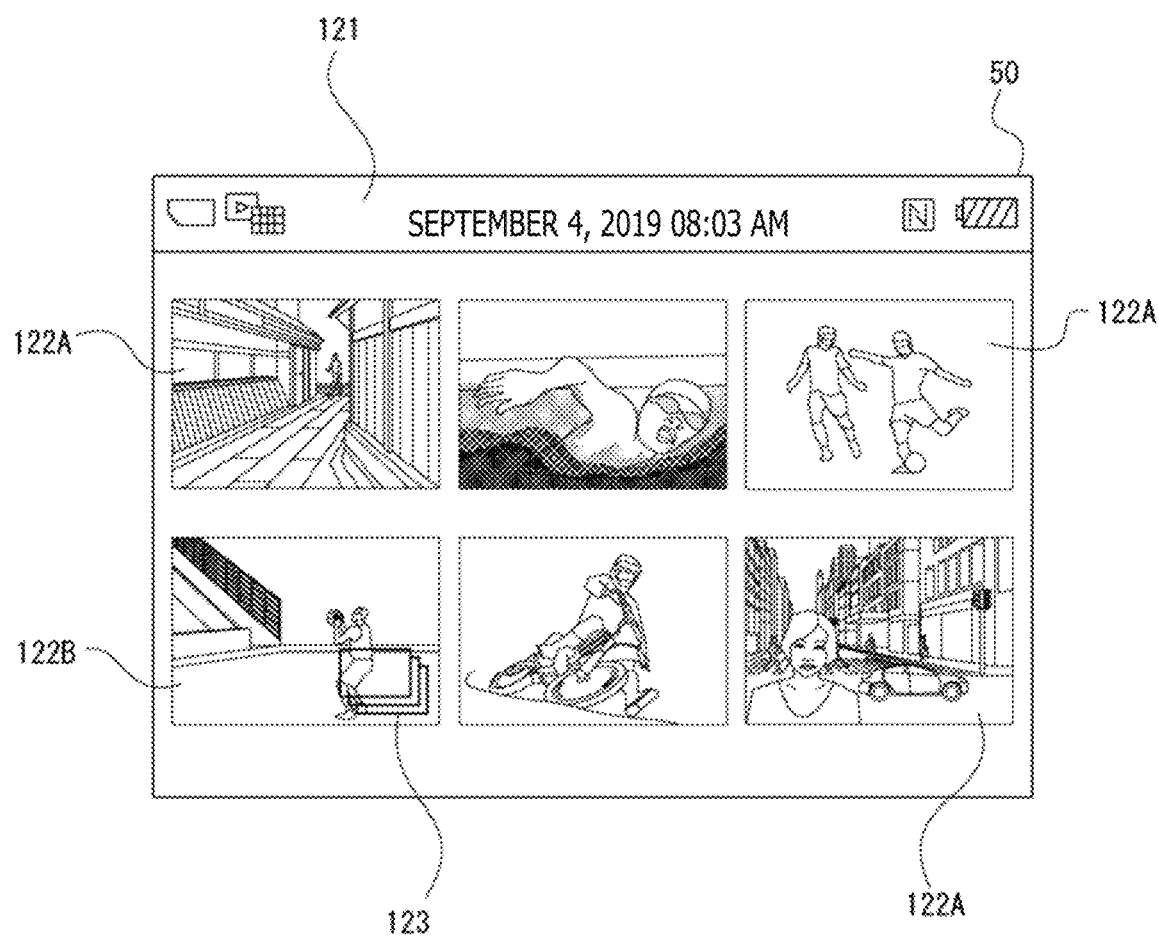
FIG. 6 is an explanatory view of an image list screen according to the embodiment.

FIG. 6 illustrates an image list screen 50 on which images (still images and moving images) captured by the imaging apparatus 1 can be viewed in a list.

For example, the image list screen 50 is a screen displayed on the display panel 101 in a reproduction mode.

A status bar 121 and a thumbnail image 122 of each of a plurality of captured images are displayed on the image list screen 50. The status bar 121 displays time information, an indicator, and the like. The indicator indicates battery charge status.

Either a thumbnail image 122A or a thumbnail image 122B is displayed as the thumbnail image 122. The thumbnail image 122A is for one image captured in the single shooting mode. The thumbnail image 122B is for an image group and represents, in a stacked form, a plurality of images that has been captured in the continuous shooting mode.

One of the plurality of images included in the image group is selected as a representative image for the thumbnail image 122B of the image group. The captured image used for the thumbnail image 122B may be selected by the user or may be automatically selected.

For example, the image captured first among the plurality of images captured in the continuous shooting mode is automatically selected as the representative image and used as the thumbnail image 122B.

An image group icon 123, which is the indication of the image group, is superimposed and displayed on the thumbnail image 122B of the image group.

Not only is a plurality of images captured in the continuous shooting mode automatically grouped and generated as the image group, but also a plurality of images selected by the user may be generated as the image group.

Performing a selection operation on any of the thumbnail images 122 on the image list screen 50 switches the display on the display panel 101 to the next screen.

For example, selecting the thumbnail image 122A of the image captured in the single shooting mode switches the screen to a screen on which the selected image is displayed largely.

Further, selecting the thumbnail image 122B of the image group switches the screen to a screen (see FIG. 7) on which the selected image group is displayed.

Figure 7:
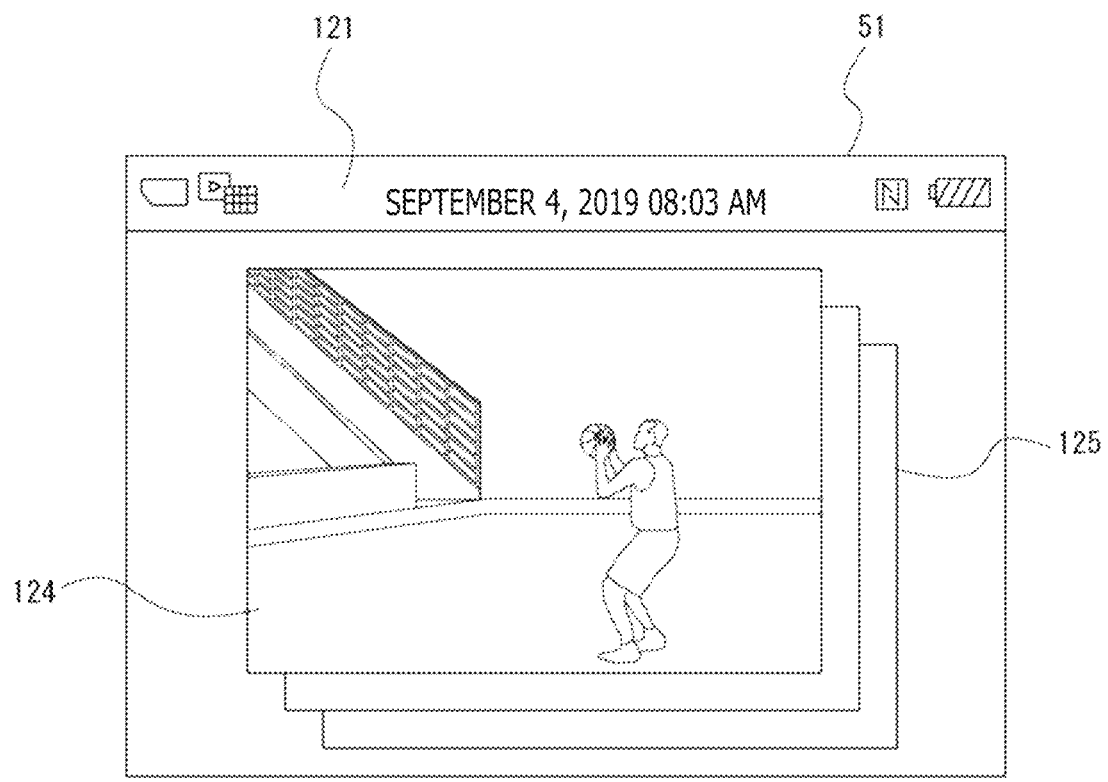
FIG. 7 is an explanatory view of a pre-expanded image group display screen according to the embodiment.

The screen illustrated in FIG. 7 is a pre-expanded image group display screen 51 and is an image group dedicated screen on which a plurality of images is displayed without being expanded.

A representative image 124 is displayed together with a frame image 125 on the pre-expanded image group display screen 51. The frame image 125 indicates that the image group includes a plurality of images.

Figure 8:
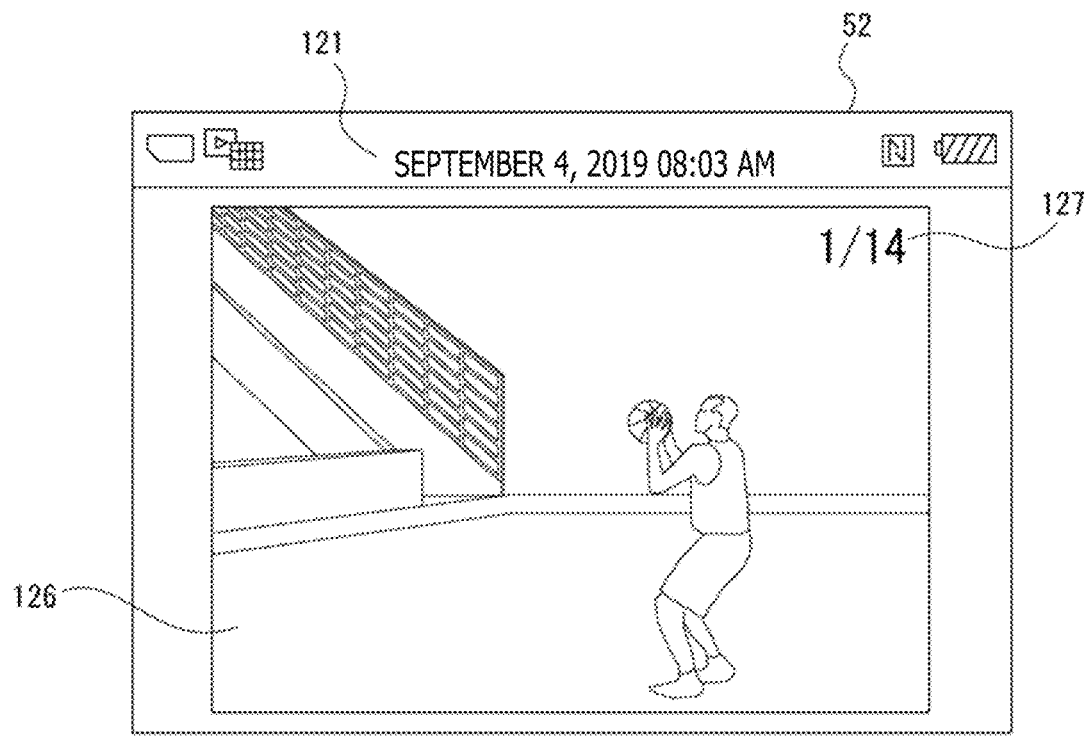
FIG. 8 is an explanatory view of an expanded image group display screen according to the embodiment.

When an operation is performed on the representative image 124 or the like on the pre-expanded image group display screen 51, an expanded image group display screen 52 illustrated in FIG. 8 is displayed on the display panel 101.

One of the plurality of images belonging to the image group is selected and displayed on the expanded image group display screen 52. In FIG. 8, the image captured first among the series of images captured in the continuous shooting mode is displayed as a display image 126.

Further, a number display 127 is displayed on the expanded display screen 52. The number display 127 indicates the total number of images belonging to the image group and the display position. The number display 127 in FIG. 8 indicates that the first image of the image group including 14 images is displayed.

Figure 9:
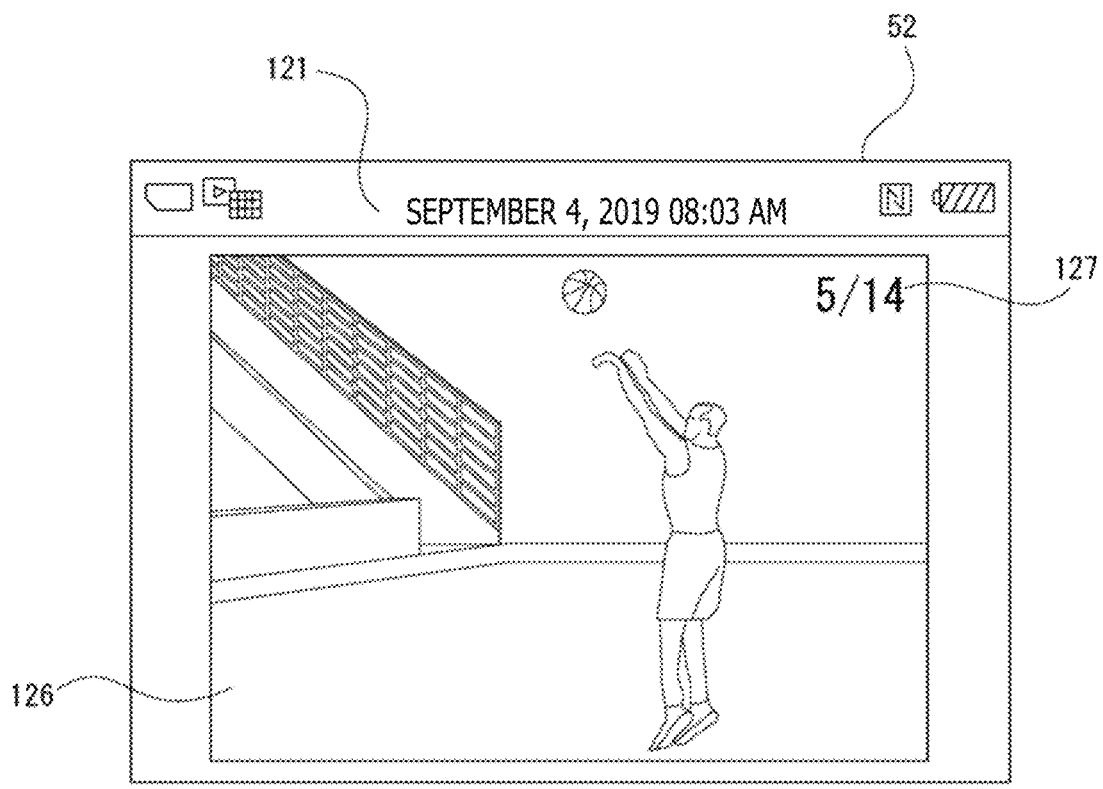
FIG. 9 is an explanatory view of the expanded image group display screen according to the embodiment.

An image feeding operation can be performed by a swipe operation or a button operation on the expanded image group display screen 52. The image feeding operation is an operation of changing the display image 126 to another image. FIG. 9 is a view of the expanded image group display screen 52 that is displayed after the image feeding operation is performed a plurality of times.

FIG. 9 illustrates a state where the fifth image among the 14 images belonging to the image group is displayed.

Long pressing the assignable button 110C in the state illustrated in FIG. 9 starts recording a voice note. In a case where the assignable button 110C being long pressed has been released or the voice note recording time has reached a predetermined time, the recording of the voice note ends.

Further, the voice note is stored in association with the display image 126 being displayed on the display panel 101 when the assignable button 110C is long pressed. In this example, since the assignable button 110C is long pressed in the state illustrated in FIG. 9, the voice note is associated with the fifth image in the image group.

Figure 10:
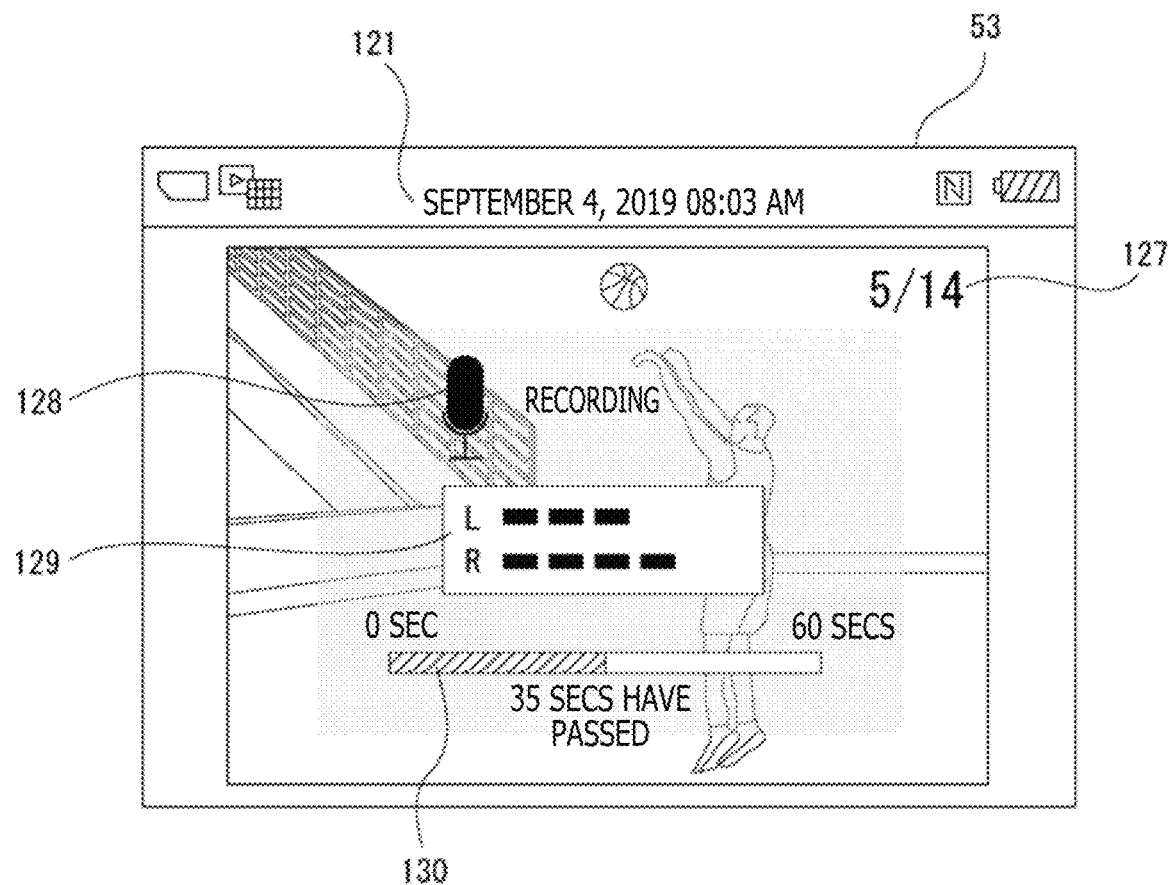
FIG. 10 is an explanatory view of a voice note recording screen according to the embodiment.

While a voice note is being recorded, a voice note recording screen 53 illustrated in FIG. 10 is displayed on the display panel 101.

A recording icon 128, a recording level gauge 129, and a recording time bar 130 are displayed on the voice note recording screen 53. The recording icon 128 indicates that recording is in progress. The recording level gauge 129 indicates the input level of each of the microphone 25L and the microphone 25R. The recording time bar 130 indicates the recording time and the remaining recording time.

In the example illustrated in FIG. 10, the maximum recording time is 60 seconds, among which the recorded time is 35 seconds.

Figure 11:
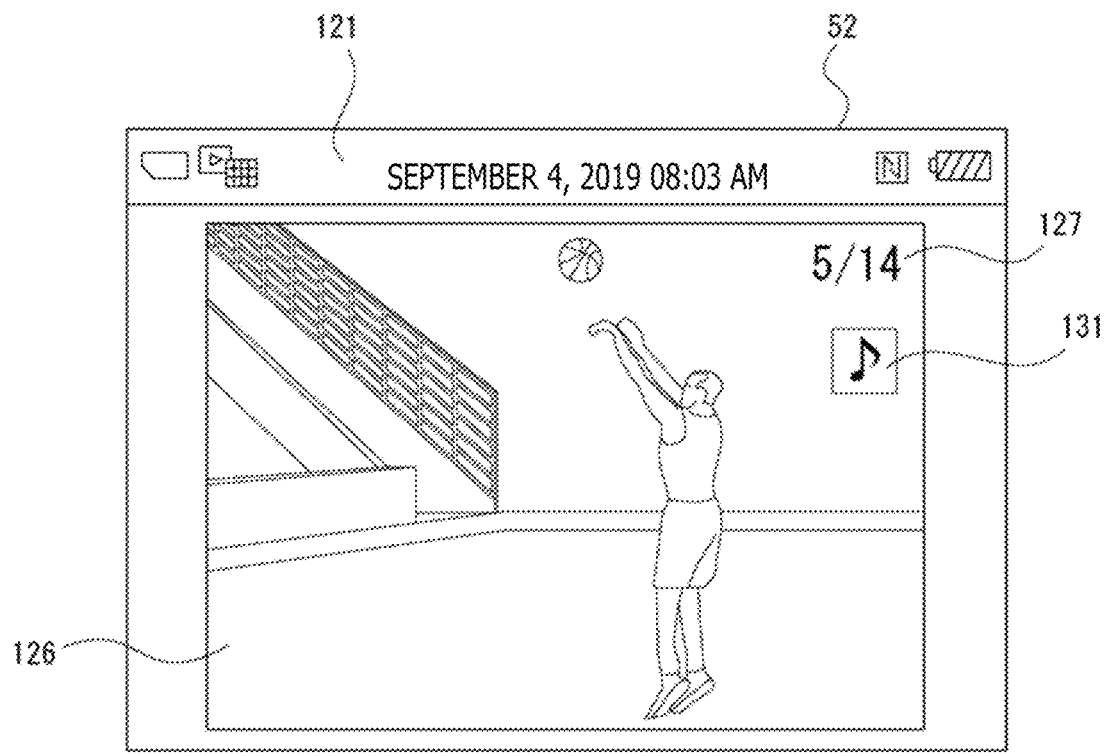
FIG. 11 is an explanatory view of the expanded image group display screen according to the embodiment.

After the 60-second recording ends or the assignable button 110C being long pressed is released before the maximum recording time is reached, the expanded image group display screen 52 illustrated in FIG. 11 is displayed on the display panel 101. FIG. 11 illustrates a state where the fifth image among the 14 images belonging to the image group is displayed in a similar manner to FIG. 9. Further, a voice note icon 131 is superimposed and displayed on the image. The voice note icon 131 indicates that the voice note is associated with this image.

When an operation of canceling the expansion display of the image group such as pressing of a return button has been performed in the state illustrated in FIG. 11, the pre-expanded image group display screen 51 illustrated in FIG. 7 is displayed on the display panel 101. The image group illustrated in FIG. 7 is in a state where the voice note corresponding to the fifth image has been recorded. However, since the representative image 124 displayed on the display panel 101 is the first image belonging to the image group and there is no voice note corresponding to the first image, the voice note icon 131 is not displayed.

Figure 12:
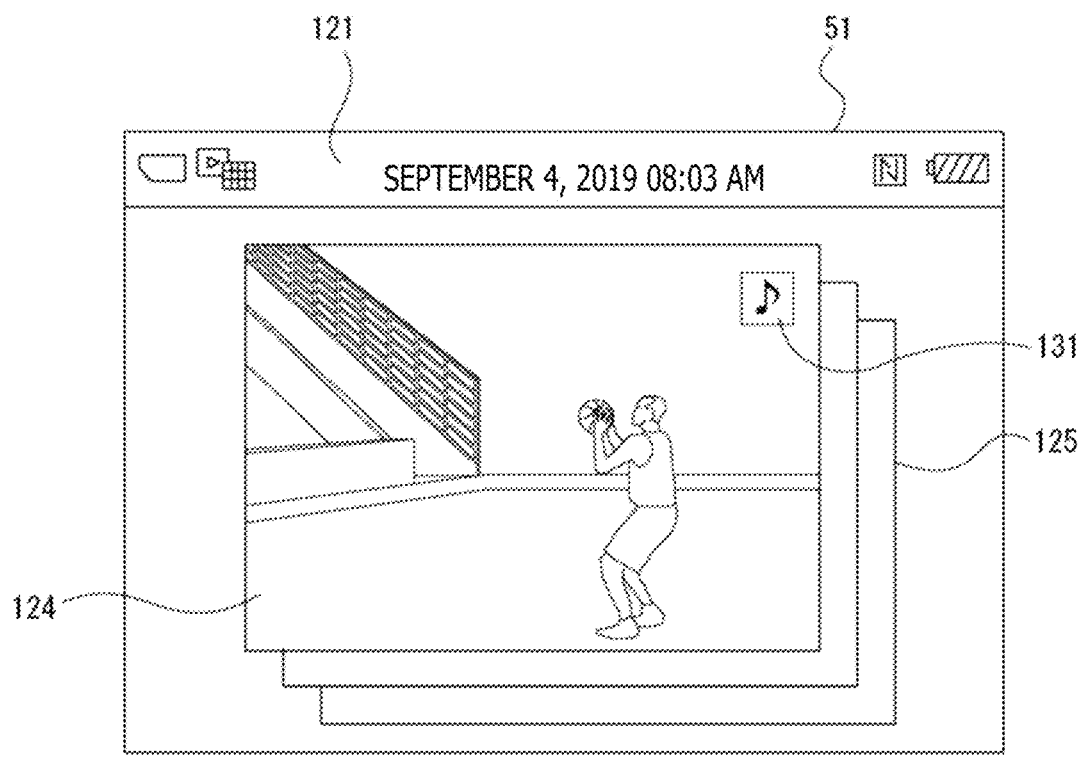
FIG. 12 is an explanatory view of the pre-expanded image group display screen according to the embodiment.

It is to be noted that in a case where a voice note has been recorded for the representative image 124, the voice note icon 131 is displayed on the pre-expanded image group display screen 51 as illustrated in FIG. 12.

Modifications of the pre-expanded image group display screen 51 that is displayed upon cancelation of the expansion display after the voice note is associated with the fifth image will be described with reference to FIGS. 12 and 13.

In the above description, in a case where a voice note corresponding to the representative image 124 has been recorded, the voice note icon 131 is displayed on the pre-expanded image group display screen 51 as illustrated in FIG. 12. As a modification, in a case where there is no voice note corresponding to the first image selected as the representative image 124 but a voice note has been associated with at least one of the images (for example, the fifth image) belonging to the image group, the voice note icon 131 may be displayed as illustrated in FIG. 12 to indicate that there is an image including a voice note among the images belonging to the image group.

Without performing the expansion display of the image group, therefore, the user can recognize, from the voice note icon 131, whether or not there is any image for which a corresponding voice note is present.

Figure 13:
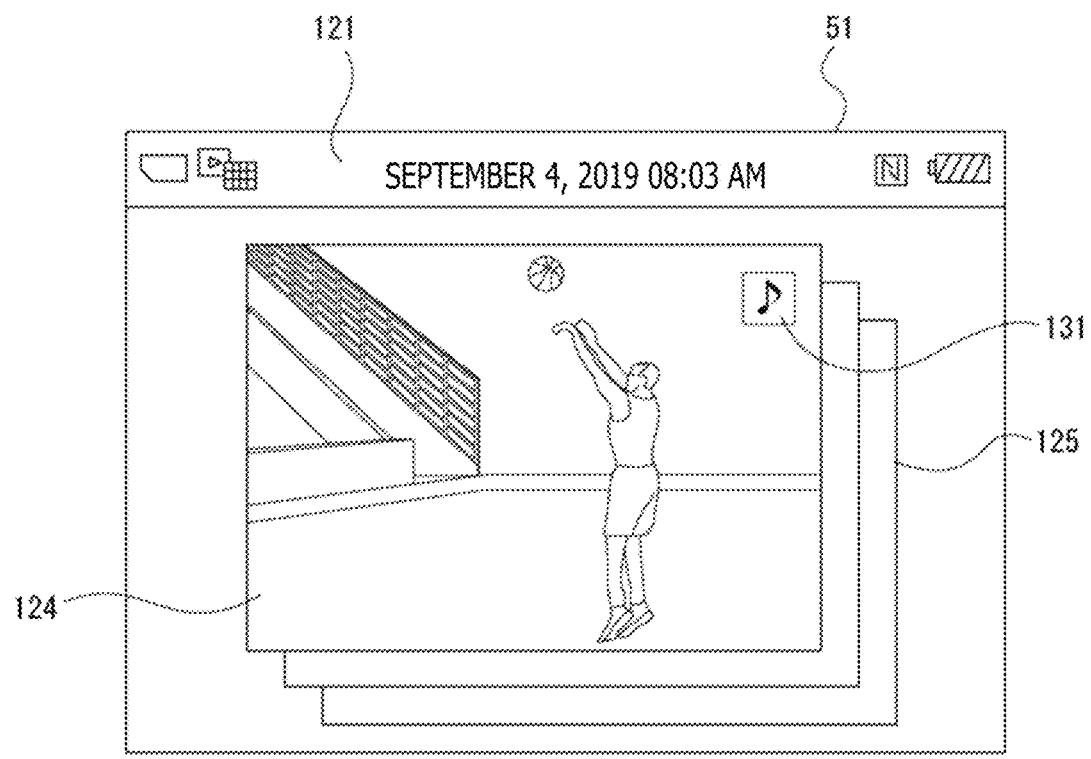
FIG. 13 is an explanatory view of the pre-expanded image group display screen according to the embodiment.

Further, a modification illustrated in FIG. 13 is an example in which one image (for example, the fifth image) among the images for which respective voice notes are present among the images belonging to the image group is newly selected as the representative image 124.

In other words, just by viewing the pre-expanded image group display screen 51 illustrated in FIG. 13, the user can recognize the presence of a voice note corresponding to any of the images in the image group and can also recognize that at least one of the images for which the voice notes are present is the image selected as the representative image 124.

Figure 14:
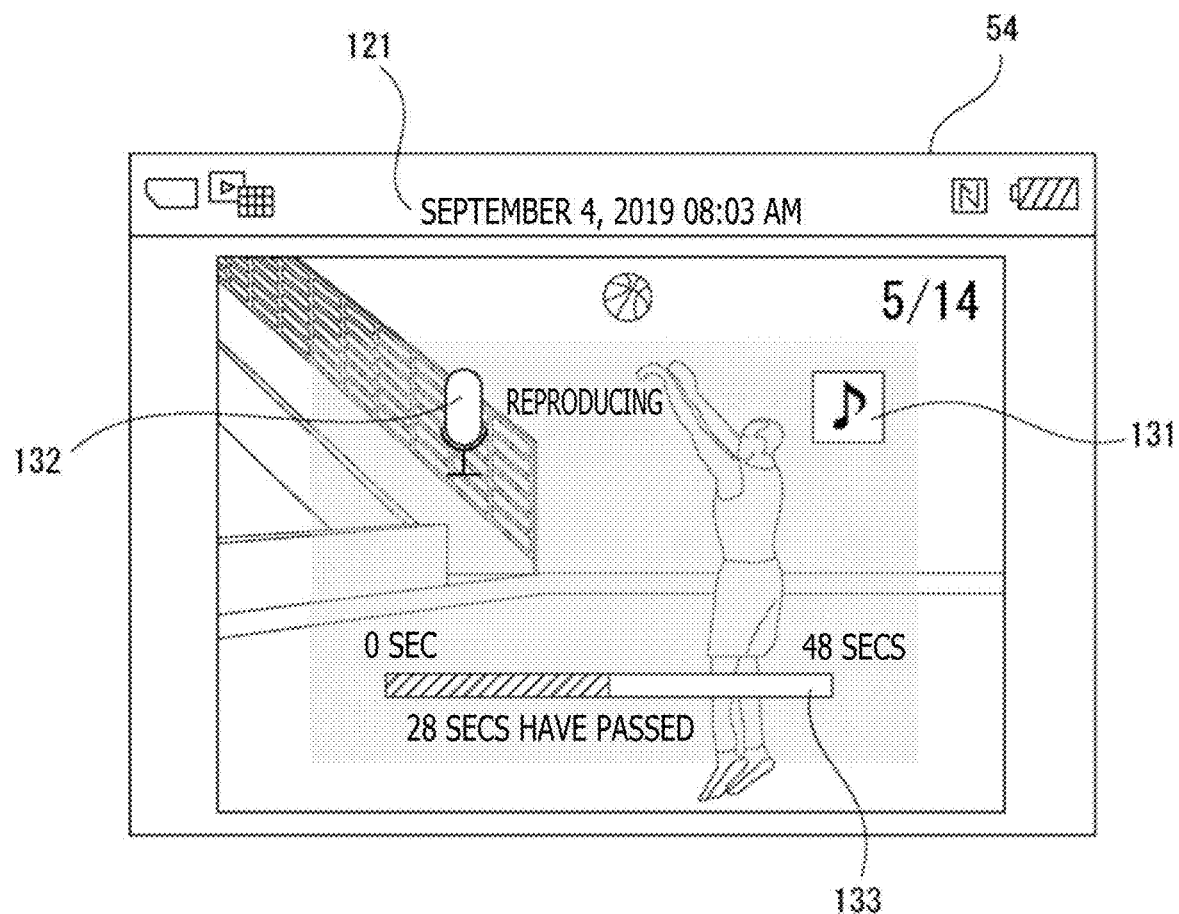
FIG. 14 is an explanatory view of a voice note reproduction screen according to the embodiment.

Incidentally, for example, in a case where a voice note reproduction operation such as the short press operation of the assignable button 110C has been performed on the expanded image group display screen 52 illustrated in FIG. 11, that is, on the expanded image group display screen 52 on which the image for which the voice note is present is displayed as the display image 126, a voice note reproduction screen 54 illustrated in FIG. 14 is displayed on the display panel 101.

The voice note icon 131, a reproduction icon 132, and a reproduction time bar 133 are displayed on the image associated with the voice note to be reproduced on the voice note reproduction screen 54. The reproduction icon 132 indicates that the voice note is being reproduced. The reproduction time bar 133 indicates the recording time of the voice note and the number of seconds recording has been performed.

For example, the reproduction icon 132 is an icon image having an identical shape to and a different color from the recording icon 128 illustrated in FIG. 10.

The example illustrated in FIG. 14 indicates that the recording time length of the voice note is 48 seconds and a portion 27 seconds after the start of the reproduction is being reproduced.

Figure 15:
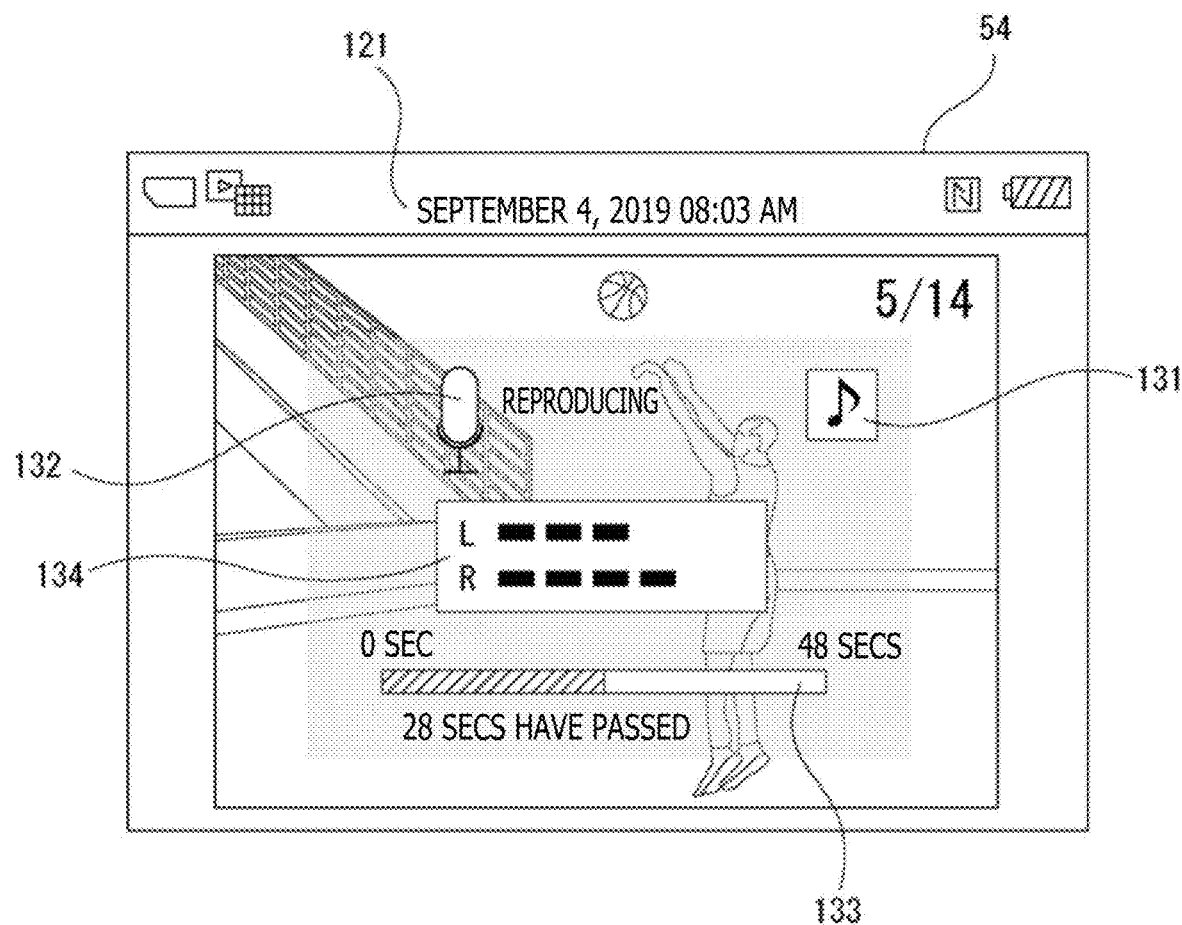
FIG. 15 is an explanatory view of a modification of the voice note reproduction screen according to the embodiment.

A modification of the voice note reproduction screen 54 is illustrated in FIG. 15.

In addition to the voice note icon 131, the reproduction icon 132, and the reproduction time bar 133, a reproduction level gauge 134 is displayed on the voice note reproduction screen 54 illustrated in FIG. 15. The reproduction level gauge 134 indicates the reproduction level of each of a left channel and a right channel.

Figure 16:
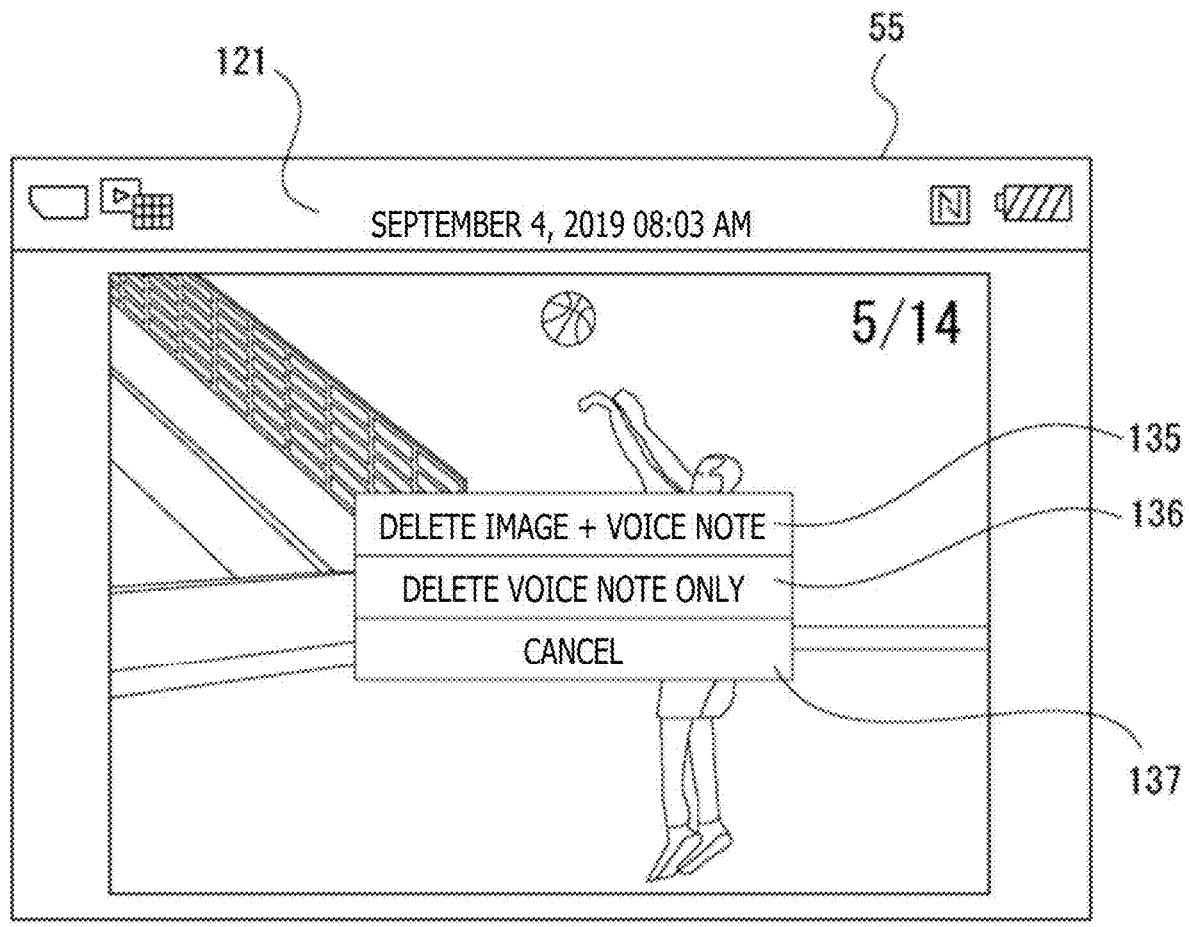
FIG. 16 is an explanatory view of a deletion target selection screen according to the embodiment.

In a case where, for example, an operation for deleting the voice note has been performed on the expanded image group display screen 52 illustrated in FIG. 11, that is, on the expanded image group display screen 52 on which the image for which the corresponding voice note is present is displayed as the display image 126, a deletion target selection screen 55 illustrated in FIG. 16 is displayed on the display panel 101.

The deletion target selection screen 55 presents three operable options to the user. Specifically, a first option 135, a second option 136, and a third option 137 are displayed. The first option 135 deletes both the image file PF and the audio file AF as the voice note. The second option 136 only deletes the audio file AF as the voice note and keeps the image file PF in the record. The third option 137 cancels the deletion operation.

The image file PF and/or the audio file AF to be deleted in a case where any one of the first option 135 and the second option 136 has been operated is(are) file(s) for the display image 126 being displayed on the display panel 101 at the time of the deletion operation.

Figure 17:
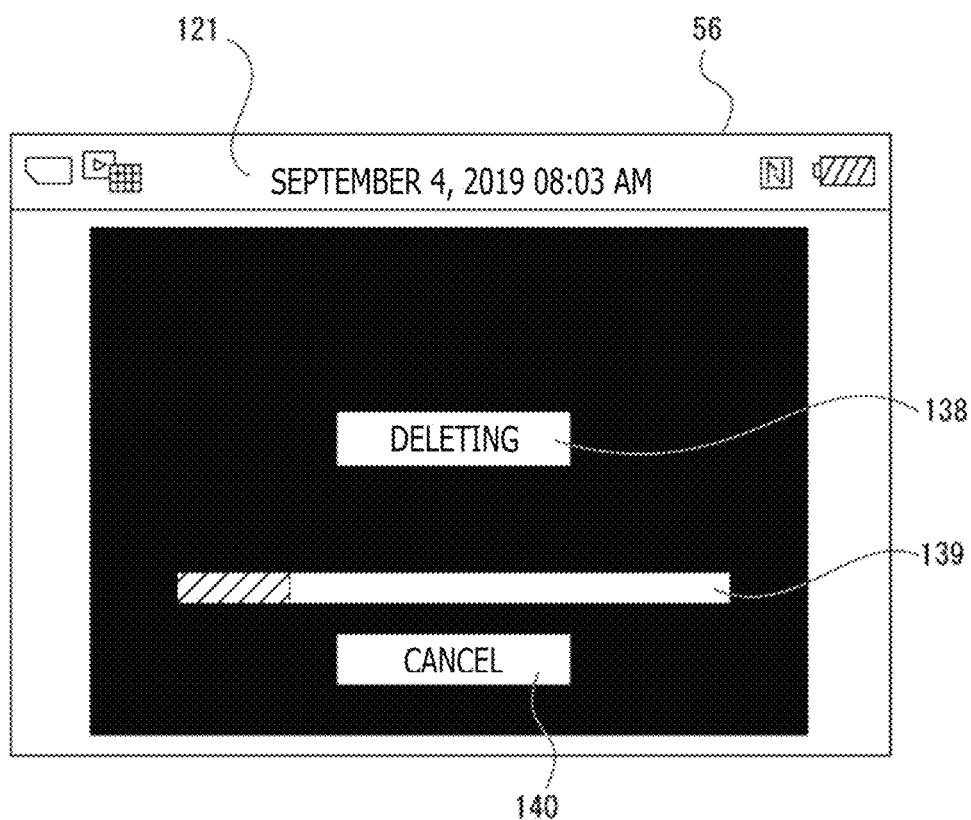
FIG. 17 is an explanatory view of a deleting screen according to the embodiment.

In a case where any of the first option 135 and the second option 136 has been operated, a deleting screen 56 illustrated in FIG. 17 is displayed on the display panel 101.

A message 138, a deletion bar 139, and a cancel button 140 are displayed on the deleting screen 56. The message 138 indicates that the deletion is in progress. The deletion bar 139 indicates the progress of the deletion process. The cancel button 140 cancels the deletion process.

When the user has operated the cancel button 140 in a state where the deleting screen 56 is displayed, the deletion of the deletion target file(s) is canceled.

Figure 18:
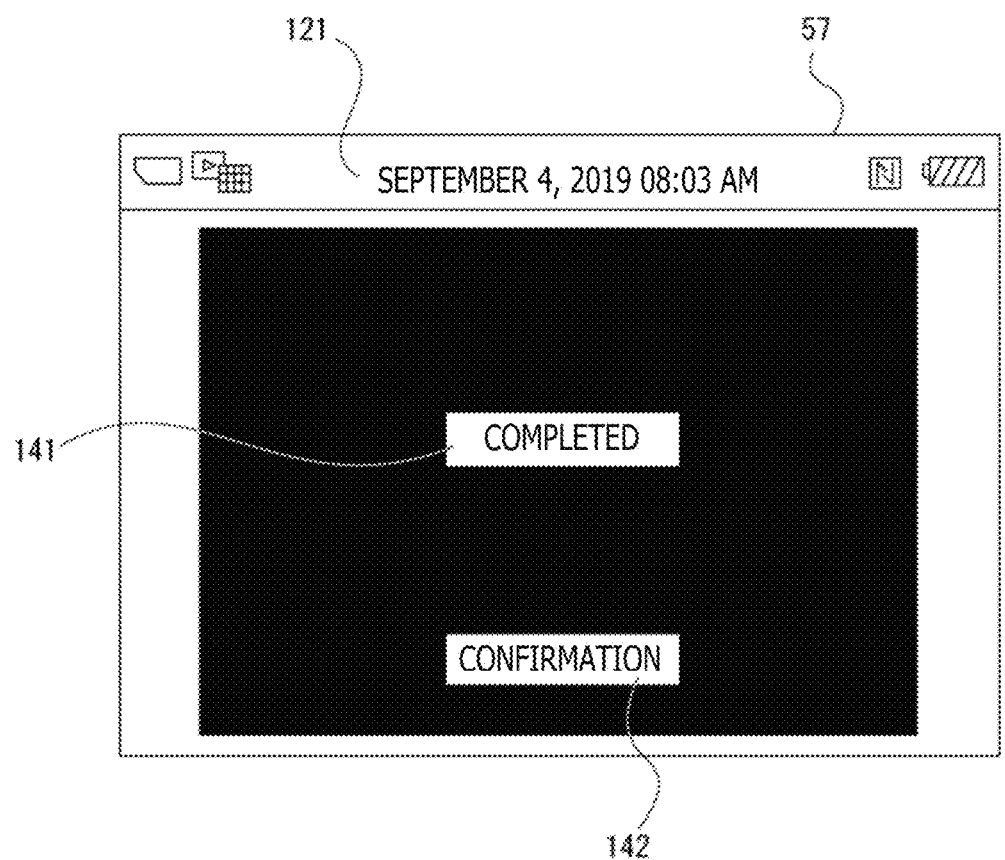
FIG. 18 is an explanatory view of a deletion completion screen according to the embodiment.

When the cancel button 140 is not operated and the time necessary for file deletion has passed, a deletion completion screen 57 illustrated in FIG. 18 is displayed on the display panel 101.

A message 141 and a confirmation button 142 are displayed on the deletion completion screen 57. The message 141 indicates the completion of the deletion. The confirmation button 142 is operated when the completion of the deletion has been confirmed.

Figure 19:
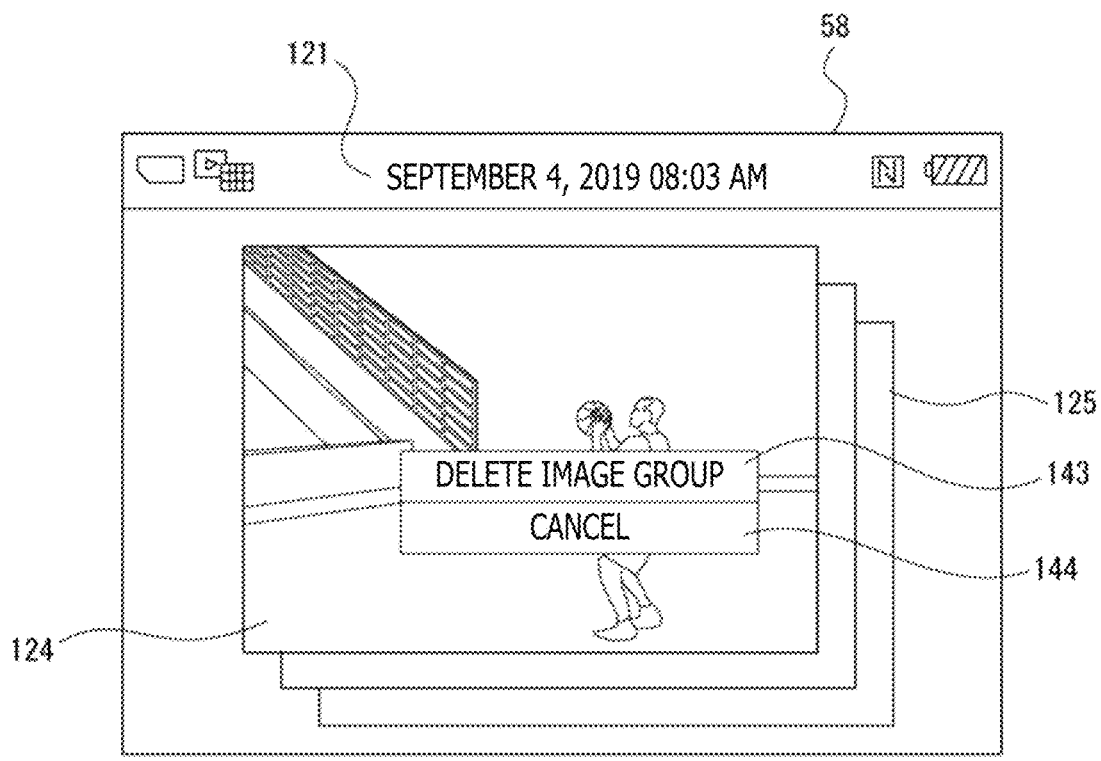
FIG. 19 is an explanatory view of a deletion selection screen according to the embodiment.

In a case where the operation for deletion or the like has been performed on the pre-expanded image group display screen 51 illustrated in FIG. 7, a deletion selection screen 58 illustrated in FIG. 19 is displayed on the display panel 101.

An all deletion option 143 and a cancel option 144 are displayed on the deletion selection screen 58. The all deletion option 143 deletes all the images belonging to the image group at a time. The cancel option 144 cancels the deletion operation.

It is to be noted that in a case where there is any audio file AF as a voice note associated with any of the images belonging to the image group and the all deletion option 143 has been operated, it is conceivable to delete not only the image files PF but also the associated audio file(s) AF.

It is to be noted that an option for deleting only the audio file AF as a voice note associated with one in the image group may be provided.

Figure 20:
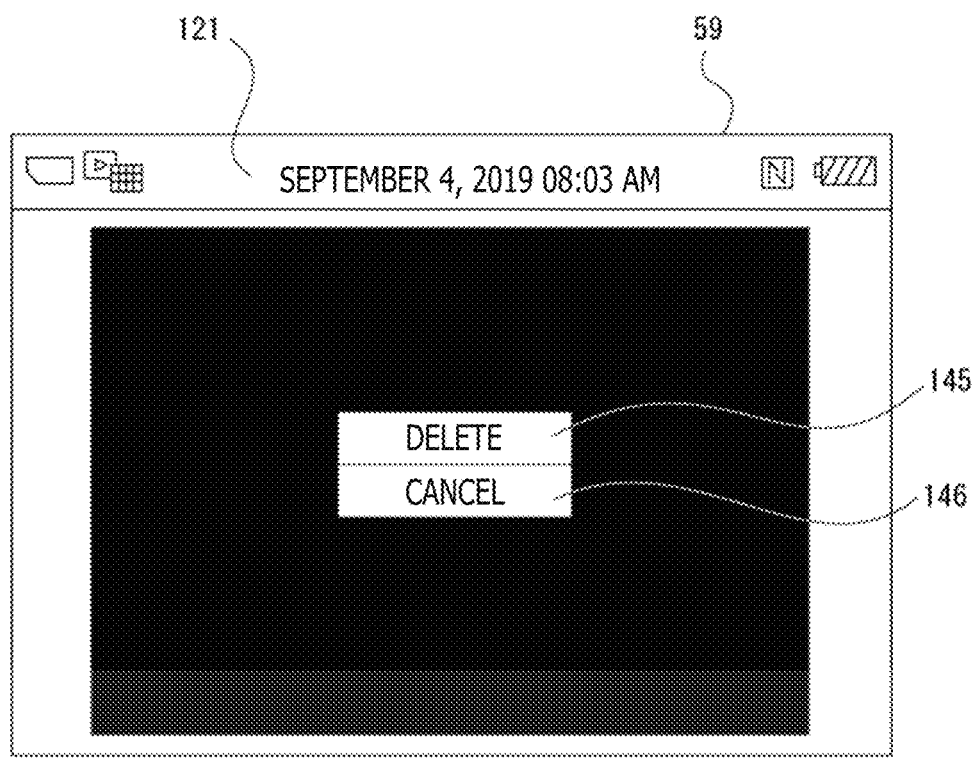
FIG. 20 is an explanatory view of a deletion selection screen according to the embodiment.

In a case where the deletion operation has been performed in a state where an image that is not associated with any voice note is displayed as the display image 126 (for example, the state illustrated in FIG. 8), a deletion selection screen 59 illustrated in FIG. 20 is displayed on the display panel 101.

A deletion option 145 and a cancel option 146 are displayed on the deletion selection screen 59. The deletion option 145 deletes the image file PF. The cancel option 146 cancels the deletion operation.

Operating the deletion option 145 starts deleting the image, and the deleting screen 56 illustrated in FIG. 17 or the like is displayed, for example.

Further, operating the cancel option 146 cancels the deletion operation and the screen returns to the screen before the cancel operation is performed (for example, the screen illustrated in FIG. 8).

5. Process Flow

<5-1. Process of Detecting Image Reproduction Operation>

Figure 21:
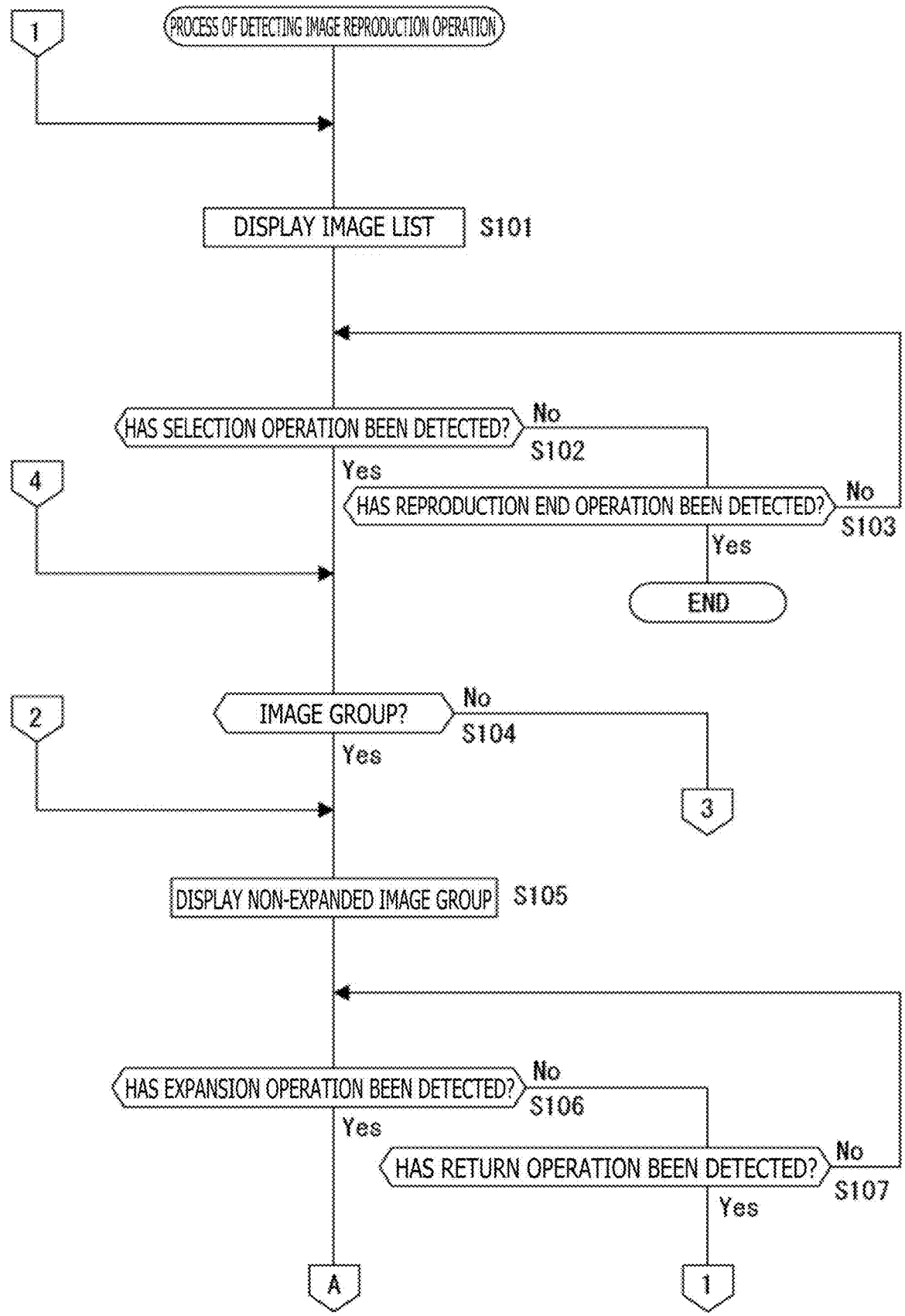
FIG. 21 is a flowchart of a process of detecting an image reproduction operation according to the embodiment.
Figure 22:
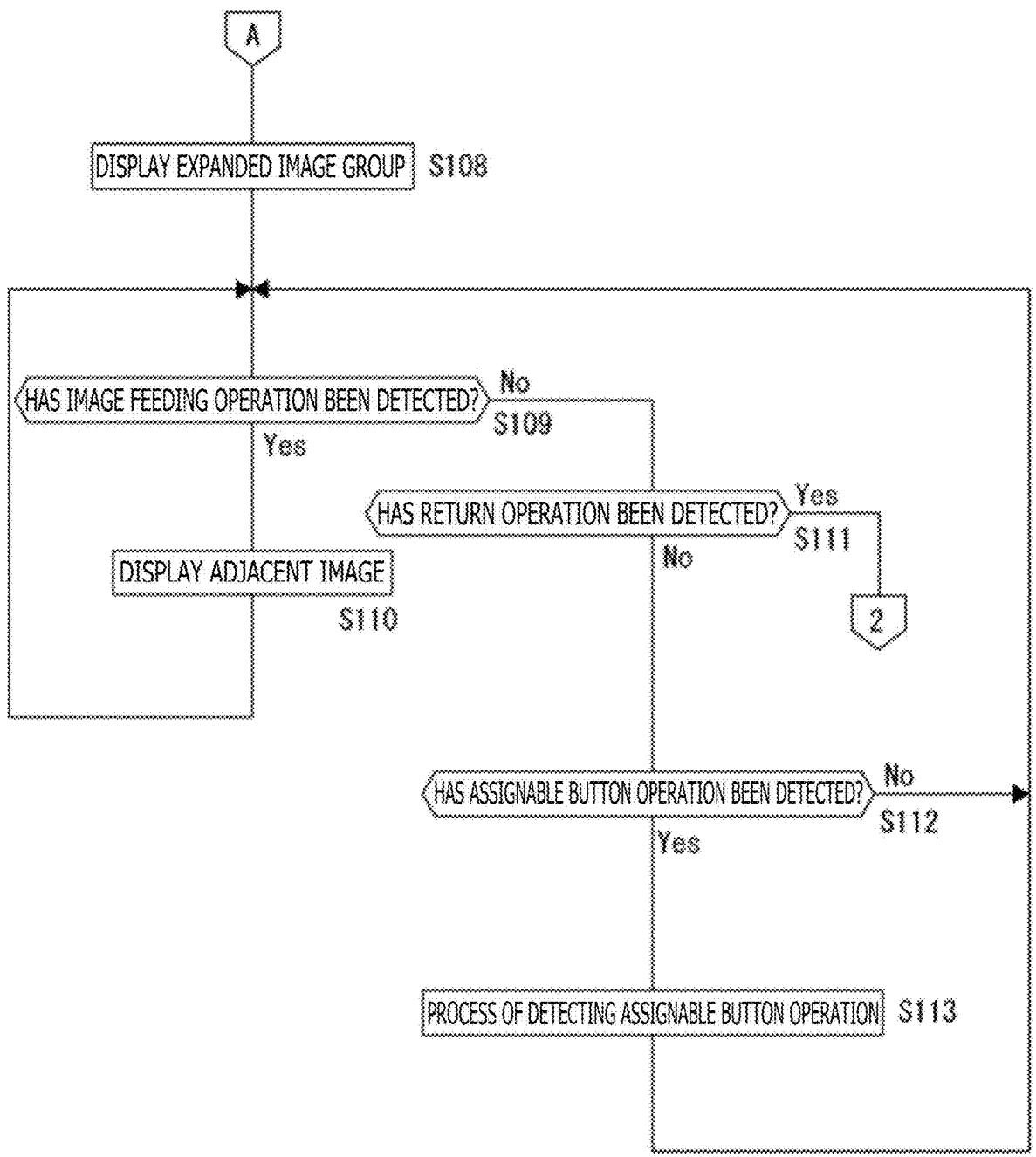
FIG. 22 is a flowchart of the process of detecting the image reproduction operation according to the embodiment.
Figure 23:
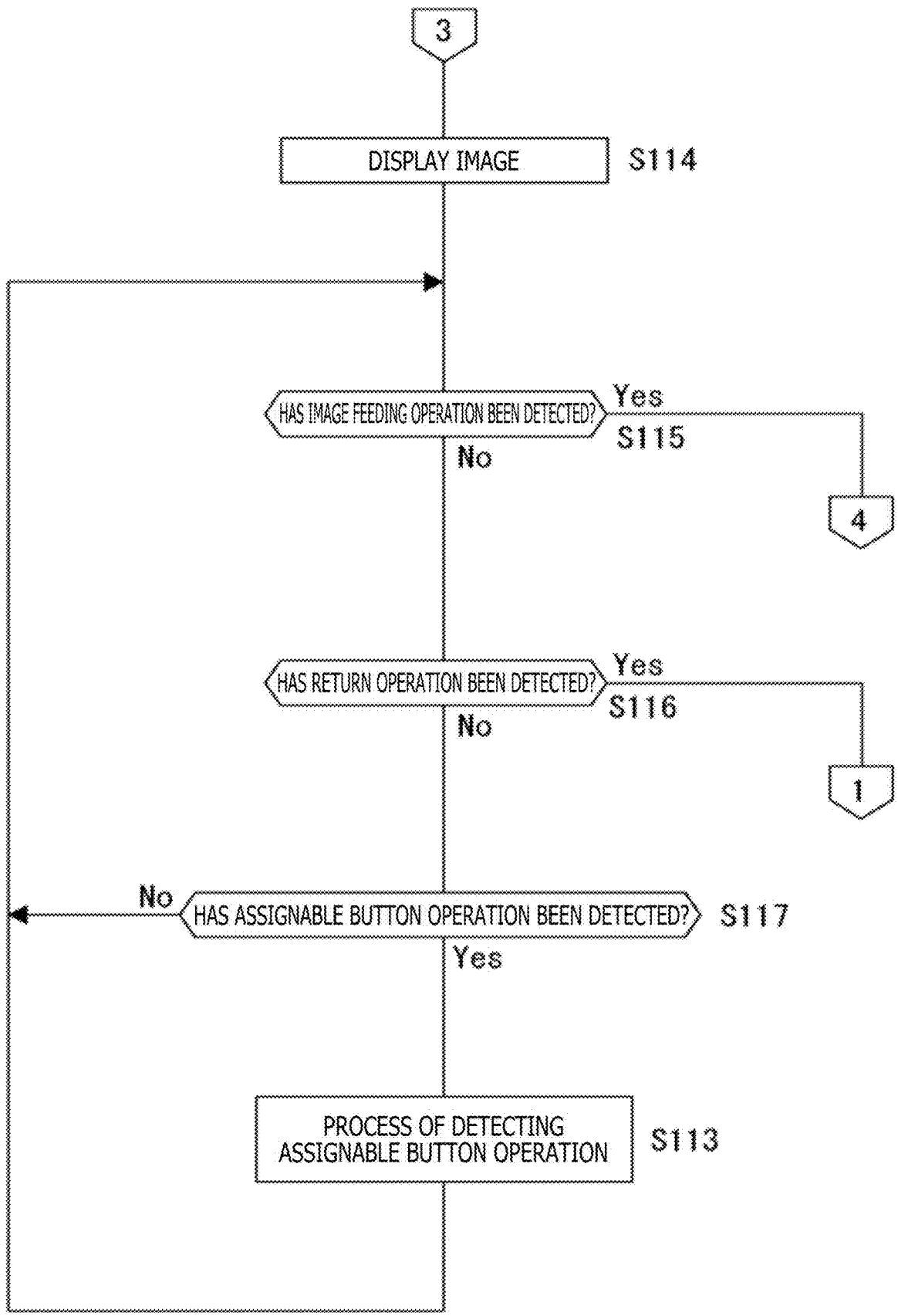
FIG. 23 is a flowchart of the process of detecting the image reproduction operation according to the embodiment.

FIGS. 21, 22, and 23 illustrate processes performed by the camera control section 18 for a process of detecting an operation for transitioning between screens and a process of performing screen transition for the image list screen 50 illustrated in FIG. 6, the pre-expanded image group display screen 51 illustrated in FIG. 7, and the expanded image group display screen 52 illustrated in FIG. 8.

A flowchart illustrated in each figure is a process of detecting the image reproduction operation and is a process that is performed when the operation of reproducing a captured image has been detected.

When the image reproduction operation has been detected, the camera control section 18 causes the image list screen 50 (see FIG. 6) to display an image list in step S101 of FIG. 21.

In step S102, the camera control section 18 determines whether or not an operation of selecting one image on the image list screen 50 has been detected. In a case where the image selection operation has not been detected, the camera control section 18 determines, in step S103, whether or not an operation of ending image reproduction has been detected.

In a case where the operation of ending image reproduction has been detected, the camera control section 18 ends the process of detecting the image reproduction operation.

In a case where the operation of ending image reproduction has not been detected, the camera control section 18 returns to the process in step S102. That is, the processes in steps S102 and S103 are repeated until the image selection operation is detected or the reproduction end operation is detected.

In a case where the operation of selecting one image (or one image group) has been performed in step S102, the camera control section 18 determines, in step S104, whether or not the selection target is an image group.

In a case where the image group has been selected, the camera control section 18 displays the pre-expanded image group display screen 51 (see FIG. 7) in step S105 to display the image group in a non-expanded form.

The camera control section 18 determines, in step S106, whether or not an expansion operation has been detected in a state where the pre-expanded image group display screen 51 is displayed. In a case where the expansion operation has not been detected, the camera control section 18 determines, in step S107, whether or not a return operation for returning to the previous screen has been detected.

In a case where the return operation has been detected, the camera control section 18 returns to step S101 to cause the image list screen 50 to be displayed, so that the previous screen is presented to the user.

In a case where the return operation has not been detected in step S107, the camera control section 18 returns to the process in step S106. That is, the camera control section 18 repeats the processes in steps S106 and S107 until either the expansion operation or the return operation is detected.

In a case where the expansion operation has been detected in step S106, the camera control section 18 displays the expanded image group display screen 52 (see FIG. 8) to display the image group in an expanded form in step S108 of FIG. 22.

In step S109, the camera control section 18 determines whether or not the image feeding operation such as the swipe operation or pressing of a direction key has been detected on the expanded image group display screen 52. In a case where the image feeding operation has been detected, the camera control section 18 performs, in step S110, a process of displaying an adjacent image corresponding to the operation. The plurality of images belonging to the image group is displayed in turn on the display panel 101 through appropriate detection of the image feeding operation.

In a case where the image feeding operation has not been detected in step S109, the camera control section 18 determines, in step S111, whether or not the return operation has been detected. In a case where the return operation has been detected, the camera control section 18 returns to step S105 to cause the pre-expanded image group display screen 51 to be displayed, so that the previous screen is presented to the user. In this manner, the display before the expansion of the image group and the display after the expansion thereof can be switched.

In a case where the return operation has not been detected in step S111, the camera control section 18 determines, in step S112, whether or not the operation on the assignable button 110C has been detected. It is to be noted that in this example, since operating the assignable button 110C executes the corresponding voice note-related function, the operation on the assignable button 110C is detected in step S112. In a case where the voice note-related functions have been assigned to the operation element 110 other than the assignable button 110C, the operation on the assigned operation element 110 is detected in step S112. Further, in a case where the assignable button 110C and the other additional operation element 110 execute the corresponding voice note-related function, the operations on both the assignable button 110C and the other operation element 110 are detected in step S112.

In a case where the operation on the assignable button 110C has not been detected, the camera control section 18 returns to step S109. That is, the camera control section 18 repeatedly performs the detection processes in steps S109, S111, and S112 until the camera control section 18 detects the image feeding operation, the return operation, or the operation on the assignable button 110C.

In a case where the operation on the assignable button 110C has been detected, the camera control section 18 performs a process of detecting the assignable button operation in step S113. This process is to execute each function related to a voice note according to an operation mode. Details will be described later.

Returning to the description of step S104, step S104 is a process of determining whether or not the image selected on the image list screen 50 is an image group. In this process, in a case where it is determined that the selected image is not an image group, that is, in a case where one image has been selected, the camera control section 18 performs a process of displaying the selected image in step S114 of FIG. 23.

In step S115, the camera control section 18 determines whether or not the image feeding operation has been detected on the screen displaying one image. In a case where the image feeding operation has been detected, the camera control section 18 returns to the process in step S104. That is, the camera control section 18 determines whether or not the adjacent image corresponding to the operation is an image group. In a case where the adjacent image is an image group, the camera control section 18 proceeds to the process in step S105. In a case where the adjacent image is not an image group but one image, the camera control section 18 proceeds to step S114. In this manner, the appropriate display process is performed depending on whether or not the adjacent image is an image group.

In a case where the image feeding operation has not been detected, the camera control section 18 determines, in step S116, whether or not the return operation has been detected. In a case where the return operation has been detected, the camera control section 18 returns to step S101 and presents the previous screen by displaying the image list screen 50. In this manner, the screen that displays one image and the screen that displays the image list can be switched.

In a case where the return operation has not been detected, the camera control section 18 determines, in step S117, whether or not the operation on the assignable button 110C has been detected. It is to be noted that since the voice note-related functions have been assigned to the assignable button 110C as described above, the operation on the assignable button 110C is detected in step S117.

In a case where the operation on the assignable button 110C has been detected, the camera control section 18 performs the process of detecting the assignable button operation in step S113. This process is to execute each function related to a voice note according to the operation mode. Details will be described later.

In a case where the operation on the assignable button 110C has not been detected, the camera control section 18 returns to step S115. That is, the camera control section 18 repeatedly performs the detection processes in steps S115, S116, and S117 until the camera control section 18 detects the image feeding operation, the return operation, or the operation on the assignable button 110C.

<5-2. Process of Detecting Assignable Button Operation>

Figure 24:
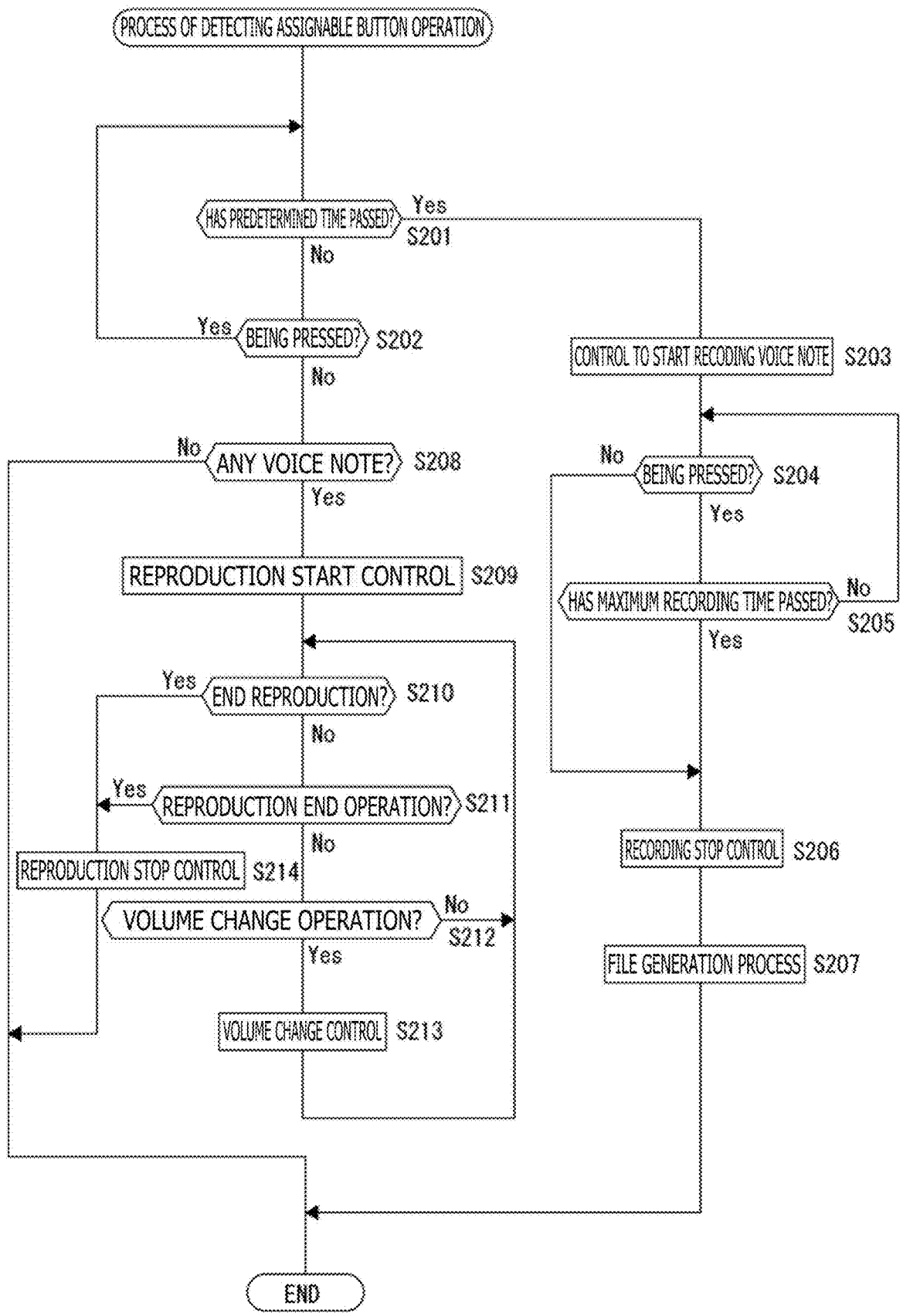
FIG. 24 is a flowchart of a process of detecting an assignable button operation according to the embodiment.

FIG. 24 illustrates a process that is performed in a case where the operation on the assignable button 110C has been detected. The assignable button 110C is the operation element assigned the voice note-related functions. The process illustrated in FIG. 24 is performed by each section (the UI control section 31, the file management section 32, and the like) of the camera control section 18.

In step S201, the camera control section 18 determines whether or not the predetermined time has passed since the start of pressing of the assignable button 110C. In a case where the predetermined time has not passed, the camera control section 18 determines, in step S202, whether or not the assignable button 110C is still being pressed.

In a case where the assignable button 110C is being pressed, the camera control section 18 returns to step S201 and determines whether or not the predetermined time has passed.

That is, in a case where the assignable button 110C has been long pressed, the camera control section 18 repeatedly performs steps S201 and S202 until the predetermined time has passed, and proceeds from step S201 to step S203 when the predetermined time has passed.

On the other hand, in a case where the assignable button 110C being pressed has been released before the predetermined time has passed, for example, in a case where the assignable button 110C has been pressed for a short period of time, the camera control section 18 proceeds to a process in step S208 from the process in step S202.

That is, the processes performed in a case where the assignable button 110C has been long pressed are the processes in and after step S203. The processes performed in a case where the assignable button 110C has been short pressed are the processes in and after step S208.

In a case where the assignable button 110C has been long pressed, the camera control section 18 performs control to start recording a voice note in step S203. For example, the camera control section 18 causes a series of operations to start to record an audio signal, which has been input from the audio input section 25, on the recording medium as the audio file AF through the processes of the audio processing section 26, the camera signal processing section 13, and the recording control section 14. At this time, for example, a process of buffering audio data based on the audio input from the microphones 25L and 25R in the camera signal processing section 13 for a maximum of 60 seconds is caused to start.

In step S204, the camera control section 18 determines whether or not the assignable button 110C is being pressed. In a case where the assignable button 110C is being pressed, the camera control section 18 determines, in step S205, whether or not the maximum recording time has passed.

In a case where it is determined that the maximum recording time has passed, that is, in a case where the assignable button 110C is continuously being pressed but the maximum recording time has not passed, the camera control section 18 returns to the process in step S204.

On the other hand, in a case where it is determined, in step S204, that the assignable button 110C is not being pressed, or in a case it is determined, in step S205, that the maximum recording time has passed, the camera control section 18 performs recording stop control in step S206. For example, through the process of the audio processing section 26, the camera control section 18 stops the process of buffering the audio signal, which has been input from the audio input section 25, in the camera signal processing section 13.

Then, in step S207, the camera control section 18 causes processes of generating the audio file AF as a voice note and storing the audio file AF in a storage medium to be performed. That is, the camera control section 18 causes a compression process, a file format generation process, and the like to be performed on the audio data buffered in the camera signal processing section 13 and causes the recording control section 14 to record the data on the recording medium in a predetermined file data format (for example, a WAV file).

In this manner, the camera control section 18 ends the series of processes of recording the voice note illustrated in FIG. 24.

In this manner, continuously pressing the assignable button 110C is determined as long press after the predetermined time has passed, and the voice note recording process starts.

The voice note recording process continues until the assignable button 110C being pressed is released or the recording time reaches the maximum recording time.

In a case where the recording time has reached the maximum recording time or in a case where the assignable button 110C being long pressed has been released before the recording time reaches the maximum recording time, the recording of the voice note stops.

After the recording stop process is performed, the camera control section 18 generates the audio file AF as a voice note corresponding to the recording process and stores the audio file AF in the memory section 19 in step S207. After the camera control section 18 ends the process in step S207, the camera control section 18 ends the series of processes illustrated in FIG. 24.

That is, in a case where the series of processes in FIG. 24 has been performed by performing step S113 of FIG. 22, the camera control section 18 returns to the process in step S109 of FIG. 22.

Further, in a case where the series of processes in FIG. 24 has been performed by performing step S113 of FIG. 23, the camera control section 18 returns to the process in step S115 of FIG. 23.

In a case where it is determined in step S202 that the operation of pressing the assignable button 110C for a short period of time has been performed, the camera control section 18 determines, in step S208, whether or not there is any voice note associated with the image being displayed on the display panel 101. In a case where there is no associated voice note, the camera control section 18 ends the series of processes illustrated in FIG. 24.

In a case where it is determined in step S208 in FIG. 24 that there is a voice note associated with the image, the camera control section 18 performs control to start reproducing the voice note in step S209. For example, the camera control section 18 instructs the recording control section 14 to start reproducing the specific audio file AF while instructing the audio reproduction section 27 to perform the reproduction operation.

During the reproduction of the voice note, the camera control section 18 determines, in step S210, whether or not the reproduction has ended, determines, in step S211, whether or not the reproduction end operation has been detected, and determines, in step S212, whether or not a volume change operation has been detected.

In a case where it is determined in step S210 that the reproduction has ended, that is, in a case where the reproduction output has reached the end of the audio data, the camera control section 18 performs reproduction stop control for the reproduction operations of the recording control section 14 and the audio reproduction section 27 in step S214 and ends the series of processes illustrated in FIG. 24.

Further, in a case where it is determined in step S210 that the reproduction has not ended, the camera control section 18 determines, in step S211, whether or not the reproduction end operation has been detected. In a case where the reproduction end operation has been detected, the camera control section 18 performs reproduction stop control for the reproduction operations of the recording control section 14 and the audio reproduction section 27 in step S214 and then ends the series of processes illustrated in FIG. 24.

Moreover, in a case where the reproduction end operation has not been detected, the camera control section 18 determines, in step S212, whether or not the volume change operation has been detected. In a case where the volume change operation has been detected, the camera control section 18 performs reproduction volume change control for the audio reproduction section 27 in step S213 and returns to the process in step S210. In a case where the volume change operation has not been detected, the camera control section 18 returns to step S210 without performing the process in step S213.

It is to be noted that in a case where a power-off operation has been detected, a process of stopping displaying the display panel 101 is performed as appropriate while the illustration thereof is omitted in each figure.

6. Modifications

Various modifications will be described.

While the voice note-related functions are aggregated in the assignable button 110C in the example described above, the voice note-related functions may be executed by operating the operation element 110 other than the assignable button 110C. In this case, the equivalent effect can be obtained by reading the process of detecting the operation of the assignable button 110C as the process of detecting the operation of the corresponding operation element 110.

Further, the voice note-related functions may not only be aggregated in one operation element 110, but also be executed by operating a plurality of buttons in a predetermined procedure. For example, while one image is displayed on the display panel 101, an operation of displaying a menu screen may be performed. Then, an operation of selecting an item for a voice note from the displayed menu may be performed, and the voice note recording function or the reproduction function may be further selected, from the item, as a function to be executed. In this manner, various functions may be executed.

In this case, it is sufficient if a process of detecting the selection of the corresponding menu item is performed, instead of detecting the operation of the assignable button 110C.

Several process examples are conceivable for a case where the operation of recording a voice note (the operation detected in step S201 of FIG. 24) has been detected while a voice note has already been associated.

For example, a possible configuration may be such that unless the voice note is deleted, a new voice note is not associated with the image. In this case, after the process in step S201, a process of determining whether or not there is any voice note that has already been associated with the target image is performed. In a case where there is no associated voice note, the processes in and after step S203 are performed.

Further, in a case where the already associated voice note has not reached the maximum recording time, additional voice note recording may be permitted. In a case where the voice note has reached the maximum recording time, the operation of recording a voice note may be disabled. In this case, after the recording operation has been detected in step S201, it is determined whether or not there is any voice note that has already been associated. In a case where there is any associated voice note, it is determined whether or not the recording time remains. In a case where the recording time remains, a process is performed for additional recording.

Moreover, even in a case where there is a recorded note that has already been associated but the operation of recording a voice note has been performed, the voice note that has already been associated may be discarded and a new voice note may be recorded.

Still further, a plurality of voice notes may be associated with one image. In this case, the file names of the audio files AF as the voice notes are named so as to make not only the associated image file PF identifiable, but also the plurality of voice notes have different file names.

While the audio file AF as a voice note is associated with one image file PF in each example described above, it may be permitted to record the audio file AF associated with the entire image group. In this case, implementation is possible by recording, in a management file, information for identifying the audio file AF associated with the entire image group, for example. The management file is used to group a plurality of images as one image group.

Further, the camera control section 18 can record a voice note associated with the entire image group by performing the process of detecting the operation on the assignable button 110C, in addition to the confirmation processes in steps S106 and S107 of FIG. 21, and performing the series of processes illustrated in FIG. 24 accordingly.

7. Summary

As described in each example described above, the imaging apparatus 1 includes a user interface control section (the UI control section 31) that performs the process of displaying a plurality of images in a stacked form (the pre-expanded image group display screen 51) as a first display mode of an image group including the plurality of images, the process of individually displaying each of the plurality of images (displaying the expanded image group display screen 52) as a second display mode of the image group, and the process of detecting an operation of recording a voice note corresponding to a selected image selected in the second display mode.

This configuration enables the image group into which the plurality of images has been grouped to be visually recognized, while enabling the plurality of images included in the image group to be individually viewed.

Since the second display mode is made available, it is easy to associate a voice note with a corresponding image included in the image group. Accordingly, information regarding an image belonging to the image group can be added using a voice note and the information regarding the image can be transmitted to a user such as an editor other than the photographer.

Further, the file management section 32 that performs generation of a file (the audio file AF) of the voice note as a separate file from the image file PF may be included.

That is, audio data is not stored as metadata of the image file PF.

Therefore, since the voice note can be handled as an independent file, it is easy to take out the voice note or record an identical voice note for a plurality of image files, for example.

Further, the plurality of images may be a series of images captured using a continuous shooting function.

By displaying a series of continuous-shot images in the first display mode, it is possible to clearly recognize that the series of continuous-shot images is the series of images.

A voice note can also be recorded for a corresponding image belonging to the series of continuous-shot images as described above. Information regarding the series of images can also be transmitted to another user.

As described with reference to the pre-expanded image group display screen 51 in FIG. 7 and the like, one of the plurality of images belonging to the image group may be displayed as the representative image 124 in the process of displaying the group in the first display mode.

Accordingly, it is possible to display, as the representative image 124, a characteristic image from which the contents of the image group can be identified.

Therefore, it is easy for the photographer and another user to identify the images belonging to the image group. Moreover, it is even easier to find out what kind of image each image included in the image group is by further obtaining information that can be obtained from the voice note.

As described with reference to the image list screen 50 in FIG. 6 and the like, the representative image 124 of the series of images captured using the continuous shooting function may be an image captured first among the series of images.

Since the series of continuous-shot images is the series of images continuously captured in a relatively short period of time, there is no great difference between the images in composition, how the subject has been captured, and the like in many cases. According to the present configuration, the first captured image is automatically selected as the representative image 124 of the series of continuous-shot images.

This eliminates the need for a process and algorithm for selecting the representative image 124, thereby reducing the process load on the camera control section 18. Further, since the representative image 124 is selected for the series of continuous-shot images, it is easy to find out what kind of image the series of continuous-shot images is.

As described with reference to the pre-expanded image group display screen 51 in FIG. 12, the user interface control section (the UI control section 31) may perform control to display, in the first display mode, the icon image (the voice note icon 131) indicating that a voice note has been recorded in the image group.

Accordingly, it is possible to recognize, from the icon image, that the voice note has been recorded in the image group.

Therefore, it is less likely that the user other than the photographer overlooks the recorded voice note when the user checks the image group. This facilitates editing task and the like.

As described with reference to the pre-expanded image group display screen 51 in FIG. 12, the user interface control section (the UI control section 31) may display, in a case where a voice note has been recorded for the representative image 124 among the images belonging to the image group, the icon image (the voice note icon 131) indicating that the voice note has been recorded in the image group.

That is, even in a case where the voice note has been recorded for an image other than the representative image 124, the icon image is not displayed.

Accordingly, since it is possible to determine whether to display the icon image only by determining whether or not the voice note has been recorded for the representative image 124, the process load on the camera control section 18 can be reduced.

As described in the modification with reference to the pre-expanded image group display screen 51 in FIG. 12, the user interface control section (the UI control section 31) may display, in a case where there is at least one image for which a voice note has been recorded among the images belonging to the image group, the icon image (the voice note icon 131).

Accordingly, it is possible to discriminate whether or not any image for which the voice note has been recorded is included without checking each image belonging to the image group.

Therefore, since this cuts out the need to check whether or not a voice note has been recorded for each image belonging to the image group, it is possible to provide the user interface that is highly convenient for the user.

As described in the modification with reference to the pre-expanded image group display screen 51 in FIG. 13, the user interface control section (the UI control section 31) may select, as the representative image 124, an image for which a voice note has been recorded among the images belonging to the image group.

Accordingly, the icon image is not displayed for an image group that does not include any image for which a voice note has been recorded, while the icon image is displayed for an image group that includes at least one image for which a voice note has been recorded.

Therefore, it is possible to check whether or not any voice note is included in the image group just by looking at the image icon. This configuration can improve the convenience.

As described in the process of detecting the image reproduction operation in FIG. 21, the user interface control section (the UI control section 31) may not generate, in the first display mode, the file of the voice note on the basis of the operation.

For example, in a case where a plurality of images is displayed in a stacked form, the operation of recording a voice note is not detected. Alternatively, even in a case where the operation of recording a voice note has been detected, the process of recording a voice note is not performed.

Accordingly, it is possible to eliminate an erroneous operation by the photographer. For example, it is possible to prevent a voice note from being associated with the entire image group despite the fact that the photographer has operated with an intention to record a voice note for the representative image of the image group, and vice versa.

As described in the modification, the user interface control section (the UI control section 31) may detect the operation in the first display mode.

For example, in a case where the operation of recording a voice note has been detected in the first display mode, the user interface control section performs the process of associating the voice note with the entire image group. Alternatively, in a case where the operation of recording a voice note has been detected in the first display mode, the user interface control section performs the process of associating the voice note with the representative image being displayed. Moreover, the user interface control section may perform the display process to enable selection of a target to be associated with the voice note.

In this manner, means for allowing the photographer to record a voice note is provided in various display modes. This configuration can improve the convenience.

As indicated by the description of the file management section 32, the file management section 32 may assign a file name of the voice note such that a character string of a portion excluding an extension is identical to a character string of a file name of a target image to be associated.

Accordingly, it is possible to identify the image file associated with the voice note from the file name.

Therefore, even in a case where there is no information associating the voice note file with the image file, the user other than the photographer can easily identify which image file the voice note relates to. This configuration can improve the convenience.

As described with reference to the deletion target selection screen 55 in FIG. 16, the user interface control section (the UI control section 31) may perform, in a case where the user interface control section has detected the deletion operation for an image for which the voice note has been recorded, the process of presenting to the user the first option 135 for deleting both the image and the voice note, the second option 136 for deleting only the voice note, and the third option 137 for canceling the deletion operation.

Displaying the option for cancellation and the options for performing the deletion at the same time can reduce the number of operations until the deletion and reduce the operation burden on the user.

The program according to the embodiment is a program that causes each process illustrated in FIGS. 21 to 24 to be performed by the CPU, the DSP, or the like, or a device including the CPU, the DSP, and the like, for example.

That is, the program according to the embodiment causes a control section such as the camera control section 18 to perform the process of displaying a plurality of images in a stacked form as the first display mode of an image group including the plurality of images.

Further, the control section is caused to perform the process of individually displaying each of the plurality of images as the second display mode of the image group.

Moreover, the control section is caused to perform the process of detecting the operation of selecting one image in the second display mode.

Still further, the control section is caused to perform the process of detecting the operation of recording a voice note corresponding to the image that has been selected.

With such a program, the above-described imaging apparatus 1 can be implemented.

The program for implementing the imaging apparatus 1 as described above can be recorded in advance on the HDD as a recording medium that is incorporated in equipment such as a computer apparatus, the ROM in the microcomputer including the CPU, or the like.

Alternatively, the program can be stored (recorded) temporarily or permanently in a removable recording medium such as a flexible disk, a CD-ROM (Compact Disc Read Only Memory), an MO (Magneto Optical) disk, a DVD (Digital Versatile Disc), a Blu-ray Disc (registered trademark), a magnetic disk, a semiconductor memory, or a memory card. Such a removable recording medium can be provided as so-called package software.

Further, such a program can be installed from the removable recording medium to a personal computer or the like, or can be downloaded from a download site through a network such as a LAN (Local Area Network) or the Internet.

Further, such a program is suitable for widely providing the imaging apparatus 1 according to the embodiment. For example, downloading the program to equipment having a camera function can make the smartphone or the like function as the imaging apparatus 1 according to the present disclosure. Examples of the equipment having a camera function include a mobile terminal apparatus such as a smartphone or a tablet, a mobile phone, a personal computer, game equipment, video equipment, a PDA (Personal Digital Assistant), or the like.

It is to be noted that the effects described in the present specification are merely examples and are not limitative. Further, other effects may be provided.

It should be understood by those skilled in the art that various modifications, combinations, sub-combinations and alterations may occur depending on design requirements and other factors insofar as they are within the scope of the appended claims or the equivalents thereof.

8. Present Technology

It is to be noted that the present technology can also be configured as follows.

(1)

An imaging apparatus including:
a user interface control section configured to perform
a process of displaying a plurality of images in a stacked form as a first display mode of an image group including the plurality of images,
a process of individually displaying each of the plurality of images as a second display mode of the image group, and
a process of detecting an operation of recording a voice note corresponding to a selected image selected in the second display mode.

(2)

The imaging apparatus according to (1), further including:
a file management section configured to generate a file of the voice note as a separate file from an image file.

(3)

The imaging apparatus according to (1) or (2), in which the plurality of images is a series of images captured using a continuous shooting function.

(4)

The imaging apparatus according to any one of (1) to (3), in which one of the plurality of images belonging to the image group is displayed as a representative image in the process of displaying the image group in the first display mode.

(5)

The imaging apparatus according to (3), in which a representative image of the series of images captured using the continuous shooting function is an image captured first among the series of images.

(6)

The imaging apparatus according to any one of (1) to (5), in which the user interface control section performs control to display, in the first display mode, an icon image indicating that a voice note has been recorded in the image group.

(7)

The imaging apparatus according to (4), in which the user interface control section displays, in a case where a voice note has been recorded for the representative image among the images belonging to the image group, an icon image indicating that the voice note has been recorded in the image group.

(8)

The imaging apparatus according to (6), in which the user interface control section displays, in a case where there is at least one image for which a voice note has been recorded among the images belonging to the image group, the icon image.

(9)

The imaging apparatus according to (4) or (7), in which the user interface control section selects, as the representative image, an image for which a voice note has been recorded among the images belonging to the image group.

(10)

The imaging apparatus according to (2), in which the user interface control section does not generate, in the first display mode, the file of the voice note on a basis of the operation.

(11)

The imaging apparatus according to any one of (1) to (9), in which the user interface control section detects the operation in the first display mode.

(12)

The imaging apparatus according to (2), in which the file management section assigns a file name of the voice note such that a character string of a portion excluding an extension is identical to a character string of a file name of a target image to be associated.

(13)

The imaging apparatus according to any one of (1) to (12), in which the user interface control section performs, in a case where the user interface control section has detected a deletion operation for an image for which the voice note has been recorded, a process of presenting to a user a first option for deleting both the image and the voice note, a second option for deleting only the voice note, and a third option for canceling the deletion operation.

(14)

An information processing method performed by an imaging processing apparatus, the information processing method including:
a process of displaying a plurality of images in a stacked form as a first display mode of an image group including the plurality of images;
a process of individually displaying each of the plurality of images as a second display mode of the image group;
a process of detecting an operation of selecting one image in the second display mode; and a process of detecting an operation of recording a voice note corresponding to the image that has been selected.

(15)

A program for causing an information processing apparatus to perform:
a process of displaying a plurality of images in a stacked form as a first display mode of an image group including the plurality of images;
a process of individually displaying each of the plurality of images as a second display mode of the image group;
a process of detecting an operation of selecting one image in the second display mode; and
a process of detecting an operation of recording a voice note corresponding to the image that has been selected.

REFERENCE SIGNS LIST

1 Imaging apparatus
18 Camera control section
31 UI control section
32 File management section
51 Pre-expanded image group display screen
52 Expanded image group display screen
55 Deletion target selection screen
110 Operation element
110S Shutter button
110C Assignable button
124 Representative image
131 Voice note icon
135 First option
136 Second option
137 Third option

The invention claimed is:

1. An imaging apparatus, comprising:
a central processing unit (CPU) configured to:
control a display screen to display, in a first display mode, an image group that includes a plurality of images in a stacked form;
control the display screen to individually display, in a second display mode, each image of the plurality of images;

select, based on a selection operation on the display screen, a first image of the plurality of images in the second display mode;

record, based on a recording operation, a first voice note in a memory, wherein the first voice note corresponds to the selected first image; and control the display screen to display, in the first display mode, a first icon image on a second image of the plurality of images, wherein the first icon image indicates the first voice note corresponding to the first image.

2. The imaging apparatus according to claim 1, wherein the CPU is further configured to generate a file of the first voice note as a separate file from an image file.

3. The imaging apparatus according to claim 1, wherein the CPU is further configured to control capture of the plurality of images based on a continuous shooting function.

4. The imaging apparatus according to claim 1, wherein the CPU is further configured to control the display screen to display one of the plurality of images as a representative image in the first display mode.

5. The imaging apparatus according to claim 3, wherein the CPU is further configured to control the display screen to display the second image as a representative image, and the second image is captured first among the plurality of images.

6. The imaging apparatus according to claim 4, wherein the representative image is a third image of the plurality of images, and the CPU is further configured to:
record, in the memory, a second voice note corresponding to the representative image; and
control the display screen to display, on the representative image, a second icon image indicating the second voice note.

7. The imaging apparatus according to claim 4, wherein the CPU is further configured to select the first image as the representative image.

8. The imaging apparatus according to claim 2, wherein the CPU is further configured to not generate, in the first display mode, the file of the first voice note based on the recording operation.

9. The imaging apparatus according to claim 1, wherein the CPU is further configured to determine the recording operation in the first display mode.

10. The imaging apparatus according to claim 2, wherein the CPU is further configured to assign a file name to the first voice note and a file name to the first image, a character string of the file name of the first voice note is identical to a character string of the file name of the first, and an extension of the file name of the first voice note is different from an extension of the file name of the first image.

11. The imaging apparatus according to claim 1, wherein the CPU is further configured to:
determine a deletion operation for the first image for which the first voice note is recorded; and
control, based on the determined deletion operation, the display screen to display a first option for deletion of the first image and the first voice note, a second option for deletion of only the first voice note, and a third option to cancel the deletion operation.

12. An information processing method, comprising:
in an imaging apparatus:
controlling a display screen to display, in a first display mode, an image group that includes a plurality of images in a stacked form;
controlling the display screen to a process of individually display, in a second display mode, each image of the plurality of images;
selecting, based on a selection operation on the display screen, a first image of the plurality of images in the second display mode;
recording, based on a recording operation, a voice note in a memory, wherein the voice note corresponds to the selected first image; and
controlling the display screen to display, in the first display mode, an icon image on a second image of the plurality of images, wherein the icon image indicates the voice note corresponding to the first image.

13. A non-transitory computer-readable medium having stored thereon, computer-executable instructions which, when executed by a processor, cause the processor to execute operations, the operations comprising:
controlling a display screen to display, in a first display mode, an image group that includes a plurality of images in a stacked form;
controlling the display screen to individually display, in a second display mode, each image of the plurality of images;
selecting, based on a selection operation on the display screen, a first image of the plurality of images in the second display mode;
recording, based on a recording operation, a voice note in a memory, wherein the voice note corresponds to the selected first image; and
controlling the display screen to display, in the first display mode, an icon image on a second image of the plurality of images, wherein the icon image indicates the voice note corresponding to the first image.

* * * * *